(12) United States Patent
Nonaka

(10) Patent No.: US 7,027,726 B2
(45) Date of Patent: Apr. 11, 2006

(54) CAMERA HAVING PROPER EXPOSURE CONTROLLING FUNCTION

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/135,069

(22) Filed: May 23, 2005

(65) Prior Publication Data

US 2005/0207745 A1    Sep. 22, 2005

Related U.S. Application Data

(62) Division of application No. 10/404,627, filed on Apr. 1, 2003, now Pat. No. 6,920,286.

(30) Foreign Application Priority Data

Apr. 2, 2002  (JP) ............................ 2002-100532
May 21, 2002 (JP) ............................ 2002-146198

(51) Int. Cl.
  *G03B 15/03* (2006.01)
(52) U.S. Cl. ..................................... 396/61; 396/165
(58) Field of Classification Search ................ 396/61, 396/165
    See application file for complete search history.

(56) References Cited

U.S. PATENT DOCUMENTS

| 4,664,495 A | * | 5/1987 | Alyfuku et al. ............. 396/234 |
| 4,929,824 A | | 5/1990 | Miyazaki |
| 5,128,707 A | | 7/1992 | Muramatsu |
| 5,678,098 A | | 10/1997 | Ishihara et al. |

FOREIGN PATENT DOCUMENTS

| JP | 61-246711 | 4/1986 |
| JP | 2934712 | 6/1999 |

* cited by examiner

*Primary Examiner*—W. B. Perkey
(74) *Attorney, Agent, or Firm*—Straub and Pokotylo; John C. Pokotylo

(57) ABSTRACT

A camera includes a luminance distribution detecting unit, a changing point determining unit, and an exposure controller. The luminance distribution detecting unit detects distribution of brightness in a photographing picture. The changing point determining unit determines a changing point of a bright portion and a dark portion with reference to the distribution of brightness detected by the luminance distribution detecting unit. The exposure controller decides that exposure is to be executed on the bright portion or the dark portion based on a position of the changing point determined by the changing point determining unit.

3 Claims, 19 Drawing Sheets

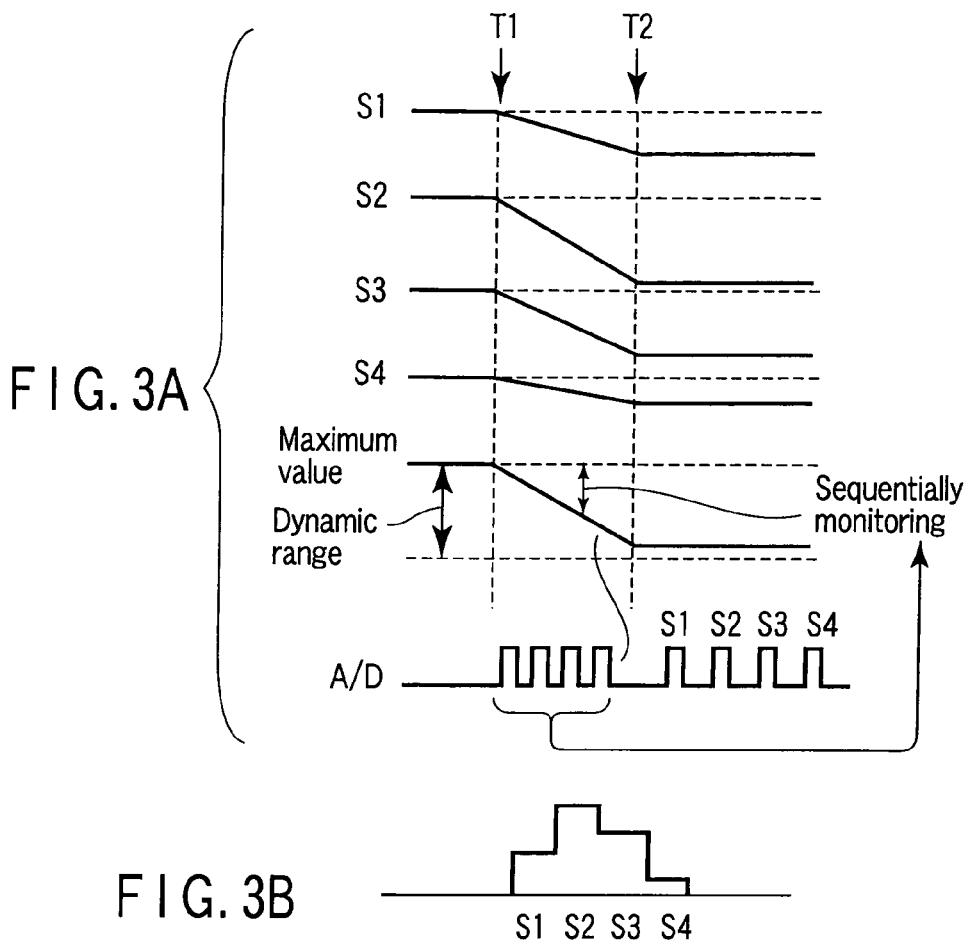
FIG. 3A
FIG. 3B
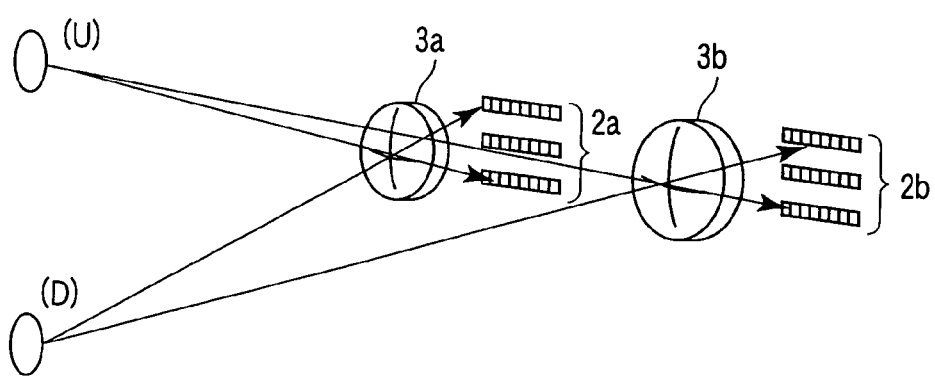
FIG. 4A
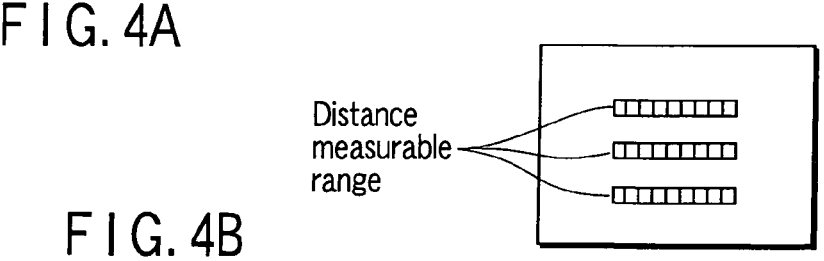
FIG. 4B

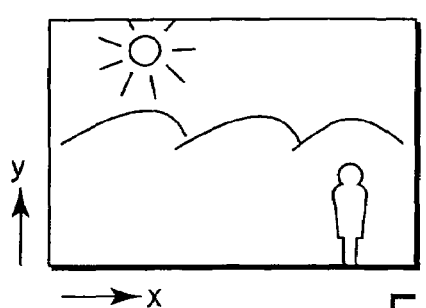
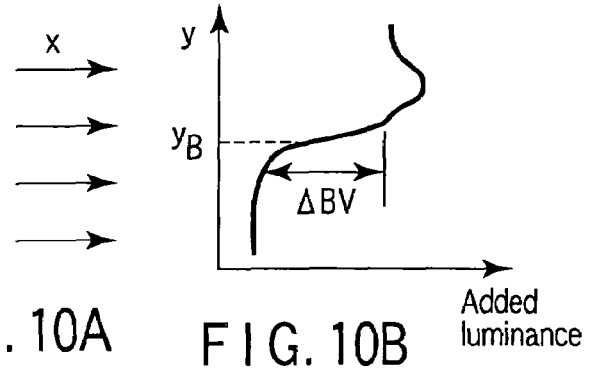
FIG. 10A  FIG. 10B
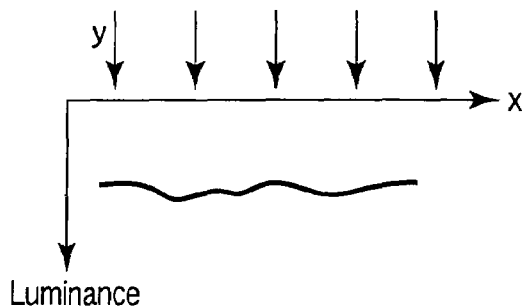
FIG. 10C
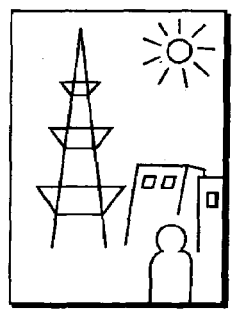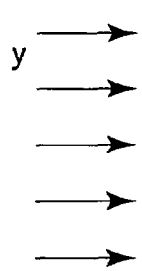
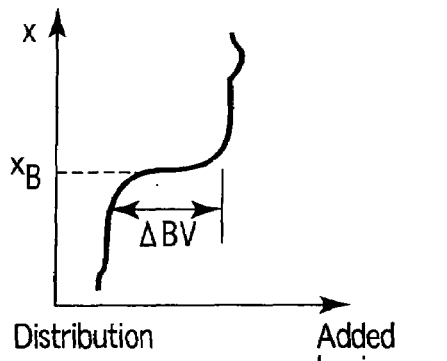
FIG. 11A  FIG. 11B
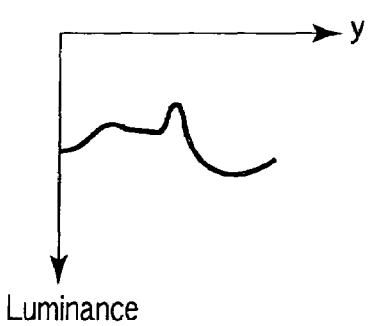
FIG. 11C

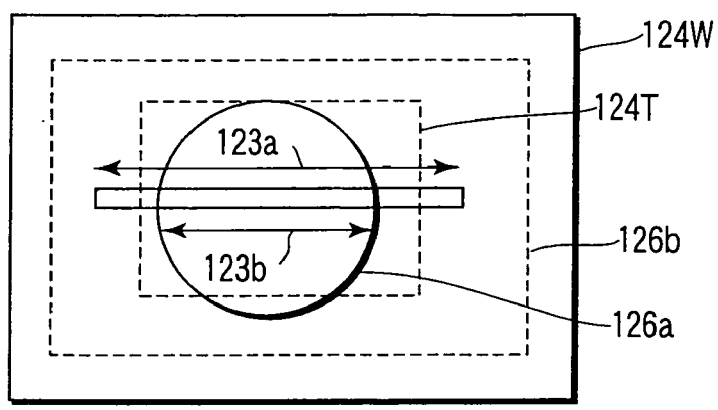
FIG. 16
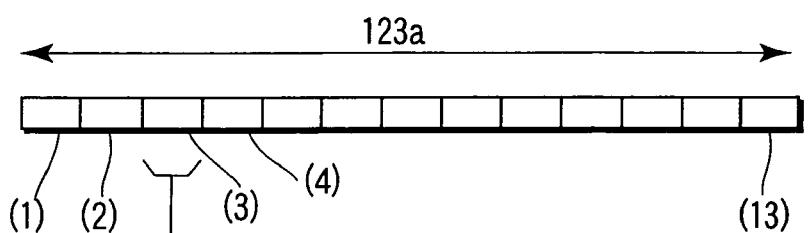
FIG. 17A
FIG. 17C
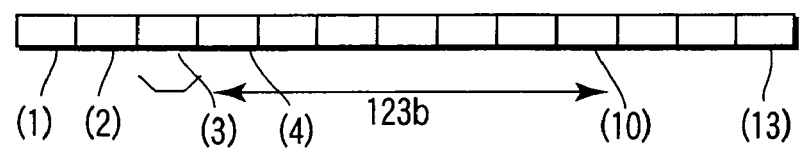
FIG. 17B
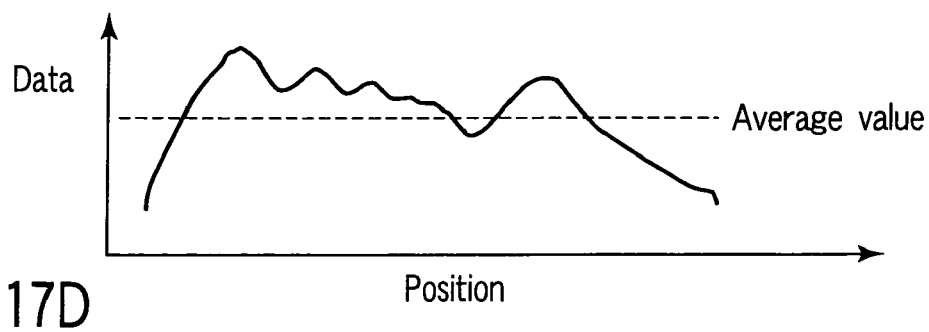
FIG. 17D

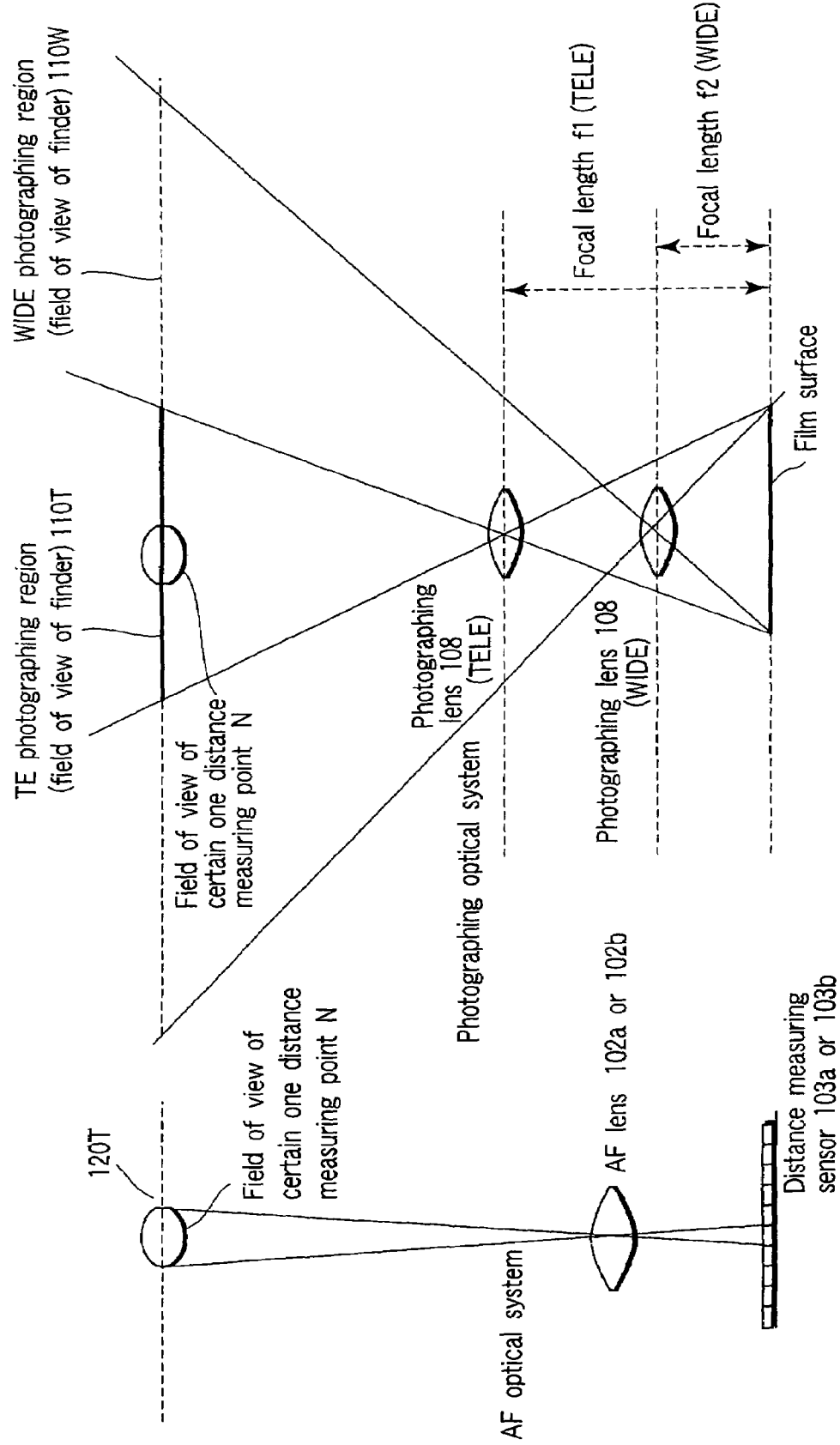

CAMERA HAVING PROPER EXPOSURE CONTROLLING FUNCTION

CROSS-REFERENCE TO RELATED APPLICATIONS

This application is a divisional of prior application Ser. No. 10/404,627, the contents of which are incorporated herein by reference, filed on Apr. 1, 2003 now U.S. Pat. No. 6,920,286, which is based upon and which claims the benefit of priority from the prior Japanese Patent Applications No. 2002-100532, filed Apr. 2, 2002; and No. 2002-146198 filed May 21, 2002, the entire contents of both of which are incorporated herein by reference.

BACKGROUND OF THE INVENTION

1. Field of the Invention

The present invention relates to a camera, and more particularly, to a camera having a proper exposure control function.

2. Description of the Related Art

In conventional cameras, when exposure is executed on only the point of a main subject, the actual scene may not be reproduced on the photographing picture.

For example, in a photograph taken with a blue sky as its background, since a film is preferentially exposed on a person, the blue portion of the sky acting as the background is not expressed in the photograph, and thus the mode of the actual scene is not expressed.

In particular, when a film having a narrow latitude is used or when photographing is executed using a digital camera, the above phenomenon may often occur.

A technology for exposing a main subject using information representing the brightness of a plurality of points in a photographing picture is disclosed in, for example, Jpn. Pat. Appln. KOKAI Publication No. 61-246711.

Further, in conventional cameras, when an AF (auto focusing) sensor has an optical system different from a photographing optical system, the AF sensor detects a different region with respect to a photographing field of view depending on a focal length of the photographing optical system.

Therefore, when, for example, the photographing optical system has a short focal length, the field of view of the AF sensor is narrower than the photographing field of view and a region smaller than an ordinary spot field of view is observed, thereby a measuring accuracy is liable to be lowered.

Further, when the photographing optical system has a long focal length, the field of view of the AF sensor is wider than the photographing field of view and has a large region which is not suitable as an ordinary spot field of view.

Japanese Patent No. 2934712 discloses a camera for determining first counterlight by automatic measurement of light (AE) as well as determining second counterlight by automatically detecting a focal length (using an AF sensor) in order to properly control exposure.

That is, in this camera, when a main subject is small or when counterlight cannot be measured by automatic exposure (AE), exposure can be properly controlled by determining counterlight by an AF sensor.

BRIEF SUMMARY OF THE INVENTION

According to a first aspect of the present invention, there is provided a camera comprising:

a luminance distribution detecting unit which detects distribution of brightness in a photographing picture;

a changing point determining unit which determines a changing point of a bright portion and a dark portion with reference to the distribution of brightness detected by the luminance distribution detecting unit; and an exposure controller which determines that exposure is to be executed on the bright portion or the dark portion based on a position in the photographing picture of the changing point determined by the changing point determining unit.

A second aspect of the present invention provides a camera according to the first aspect, further comprising:

a distance measuring Unit which measures distances of a plurality of points in the photographing picture;

a main subject position detecting unit which detects a position of a main subject based on the distances measured by the distance measuring unit; and a deciding unit which decides irradiation of flash light in accordance with the position of the main subject detected by the main subject position detecting unit and a relationship between the bright portion and the dark portion.

According to a third aspect of the present invention, there is provided a camera comprising:

a brightness and darkness distribution detecting unit which detects distribution of a bright portion and a dark portion in a photographing picture;

a distances distribution detecting unit which detects distances distribution in the photographing picture; and a controller which controls irradiation of flash light when it is determined that a focused position with respect to a distance detected by the distances distribution detecting unit corresponds to the dark portion and that a ratio of the bright portion to the dark portion is large from a detection result of detection of the distribution of the bright portion and the dark portion.

According to a fourth aspect of the present invention, there is provided a camera comprising:

a luminance difference detecting unit which detects a luminance difference between a bright portion and a dark portion in a photographing picture;

a distance detecting unit which detects respective distances of the bright portion and the dark portion; and a flash light controller which projects flash light when a large luminance difference is detected by the luminance difference detecting unit as well as when it is detected by the distance detecting unit that the dark portion has a short distance.

According to a fifth aspect of the present invention, there is provided a camera comprising:

a photographing optical system having a variable focal length to photograph a subject;

a focal length detecting unit which detects a focal length of the photographing optical system;

non TTL-AF type sensor arrays having a plurality of regions capable of detecting a luminance distribution signal of the subject;

a light measuring unit which calculates luminance of the subject based on sensor outputs from a single region or the plurality of regions of the sensor arrays; and an optical system for focusing an image signal on the sensor arrays, different from the photographing optical system, wherein the light measuring unit changes the regions of the sensor arrays used to calculate the luminance in accordance with an output from the focal length detecting unit.

According to a sixth aspect of the present invention, there is provided a camera comprising:

a photographing optical system having a variable focal length to photograph a subject;

a focal length detecting unit which detects a focal length of the photographing optical system;

non TTL-AF type sensor arrays having a plurality of regions capable of detecting a luminance distribution signal of the subject;

a light measuring unit which calculates the luminance of the subject based on sensor outputs from a single region or the plurality of regions of the sensor arrays; and an optical system for focusing an image signal on the sensor arrays, different from the photographing optical system, wherein the light measuring unit executes control such that a ratio of a field of view of the sensor arrays used for light measurement to a field of view of the photographing optical system has the same ratio regardless of the focal length of the photographing optical system.

According to a seventh aspect of the present invention, there is provided a camera comprising:

a photographing optical system having a variable focal length to photograph a subject;

a focal length detecting unit which detects a focal length of the photographing optical system;

sensor arrays which detect image signals of a subject, the image signals of the subject being capable of measuring distances of a plurality of points in a photographing picture;

a main subject position detecting unit which detects a position of a main subject based on outputs from the sensor arrays;

a light measuring unit which groups sensors of a single region or a plurality of regions of the sensor arrays and calculates luminance based on outputs from each grouped sensors; and an optical system for focusing an image signal on the sensor arrays, different from the photographing optical system, wherein the light measuring unit changes grouping of the sensors in the single region or the plurality of regions in accordance with the position of the main subject detected by the main subject position detecting unit and an output from the focal length detecting unit.

According to an eighth aspect of the present invention, there is provided a camera comprising:

a photographing optical system having a variable focal length to photograph a subject;

a focal length detecting unit which detects a focal length of the photographing optical system;

sensor arrays which detect image signals of the subject, the image signals of the subject being capable of measuring distances of a plurality of points in a photographing picture;

a main subject position detecting unit which detects a position of a main subject based on outputs from the sensor arrays;

a light measuring unit which groups sensors of one of a single region and a plurality of regions of each of the sensor arrays in accordance with the position of the main subject detected by the main subject position detecting unit and calculates luminance based on outputs from each grouped sensors; and an optical system for focusing an image signal on the sensor arrays, different from the photographing optical system, wherein the light measuring unit reduces, when output from the focal length detecting unit is located on a more distant telescopic side, a number of the sensors configuring the each grouped sensors.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWDS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are time charts for explaining an operation when integral control is executed by turning on and off switches shown in FIG. 2;

Figure 1:
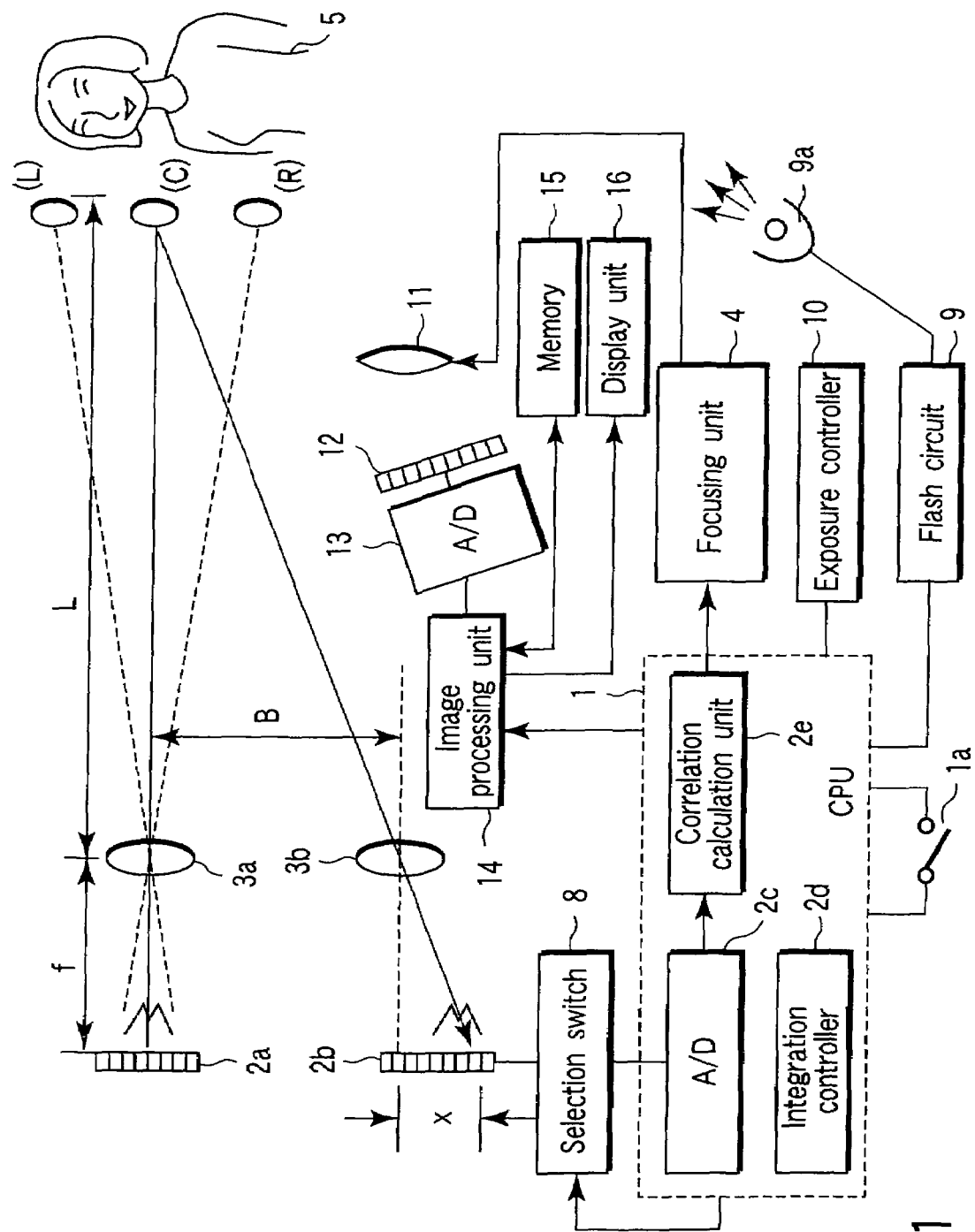
FIG. 1 is a function block diagram showing a configuration of a camera to which a first embodiment of the present invention is applied.
Figure 2:
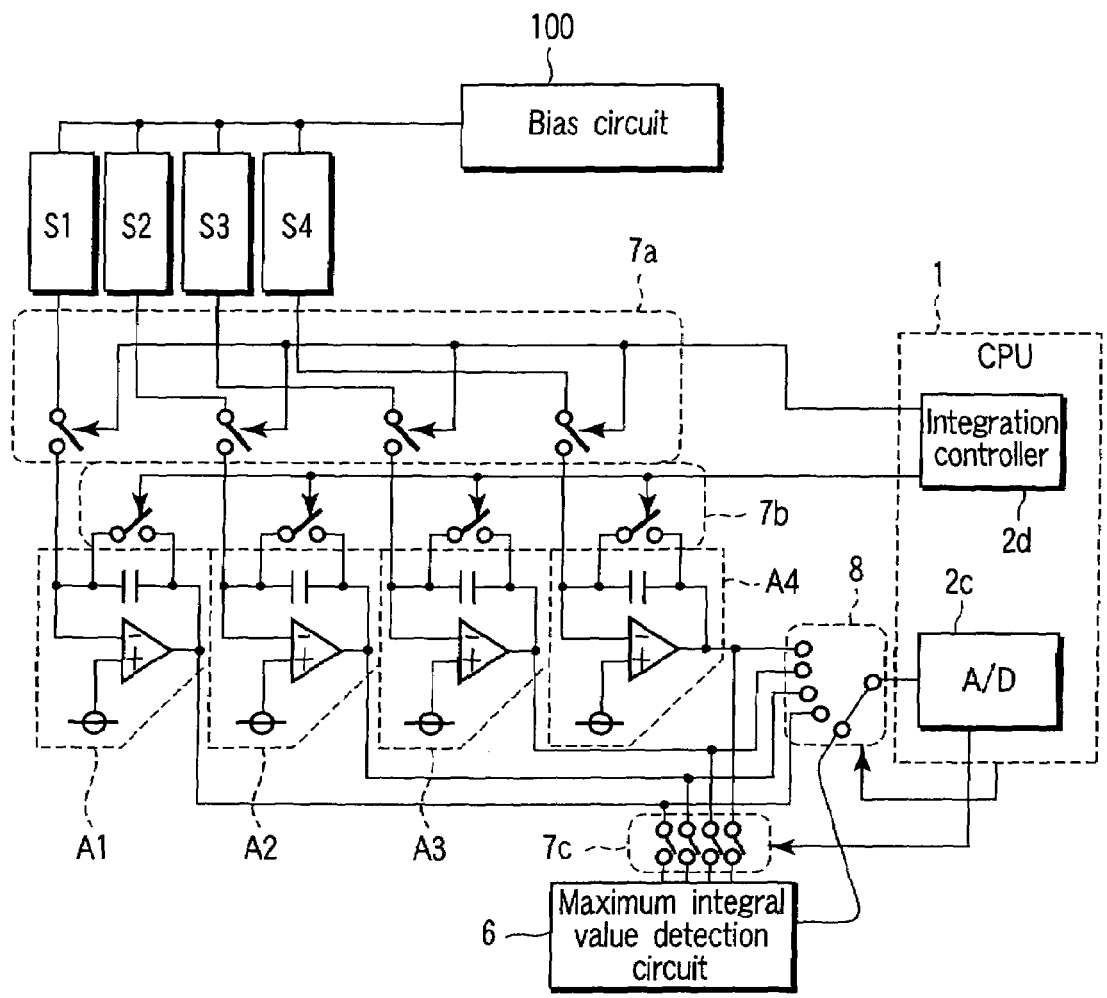
FIG. 2 is a diagram showing a configuration of a portion of sensor arrays of FIG. 1 in more detail.
Figure 5A:
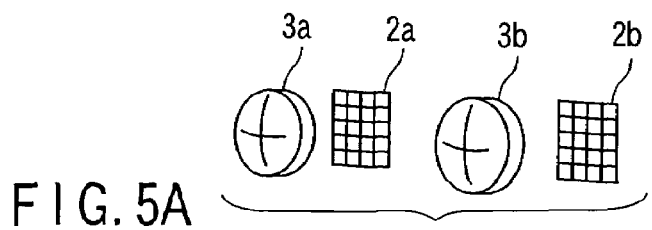
Figure 5B:
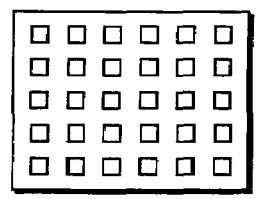
Figure 5C:
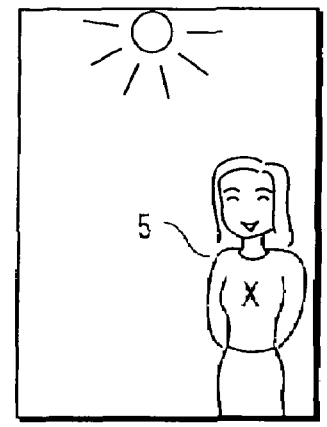
Figure 6A:
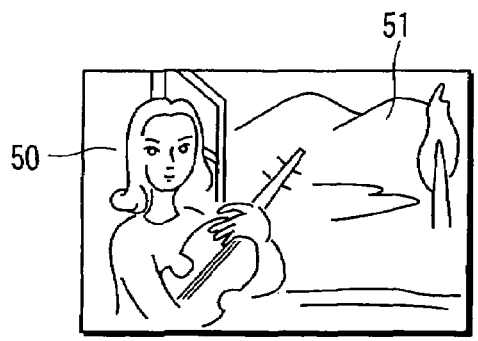
Figure 6B:
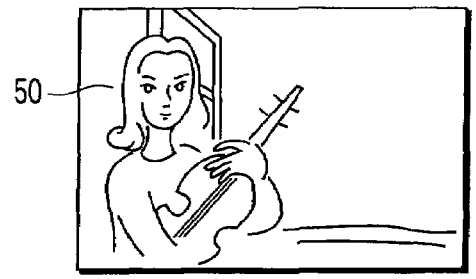
Figure 6C:
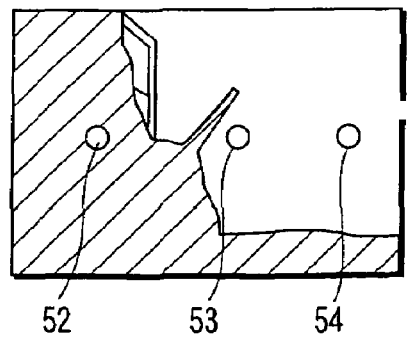
Figure 7:
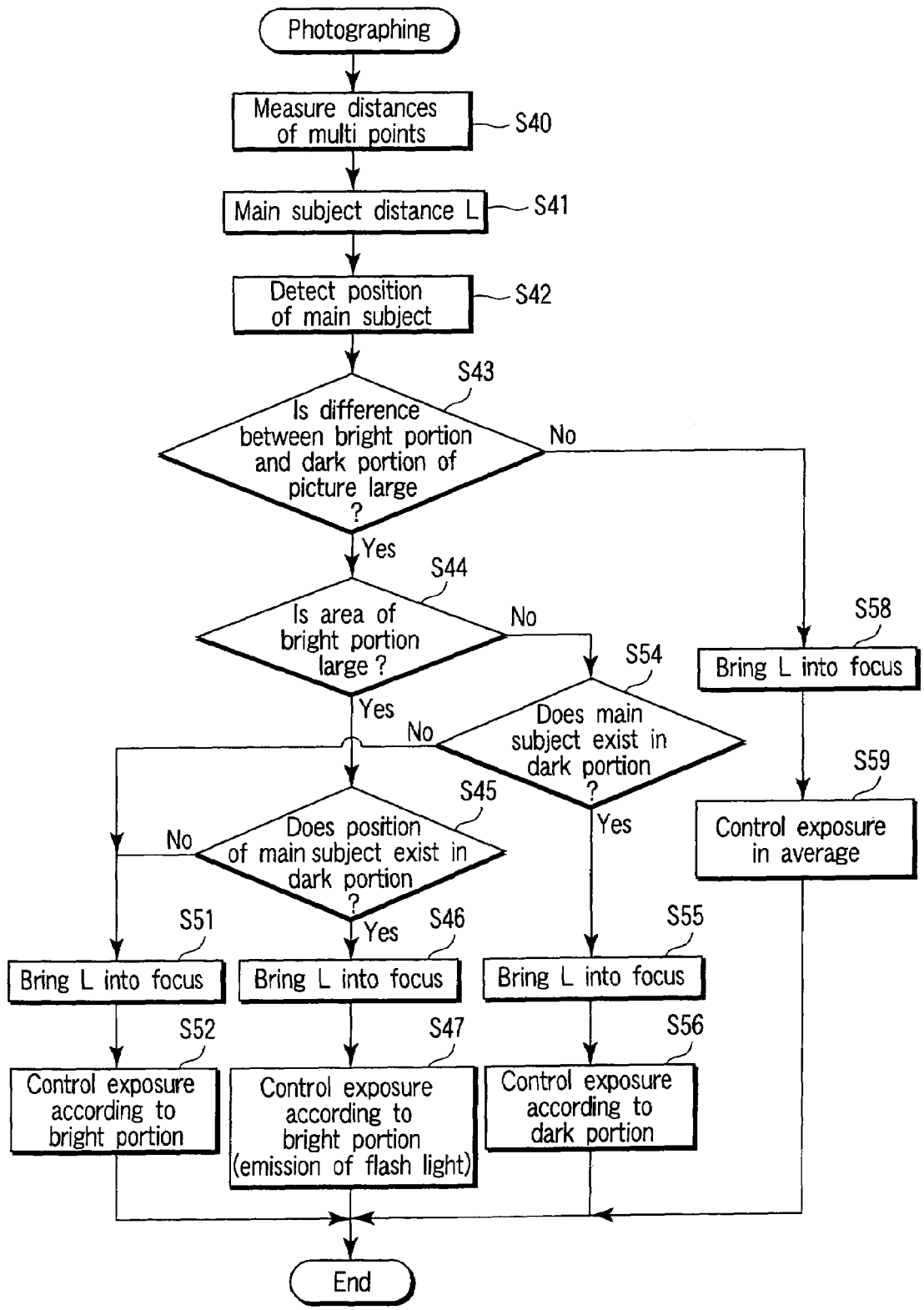
Figure 8A:
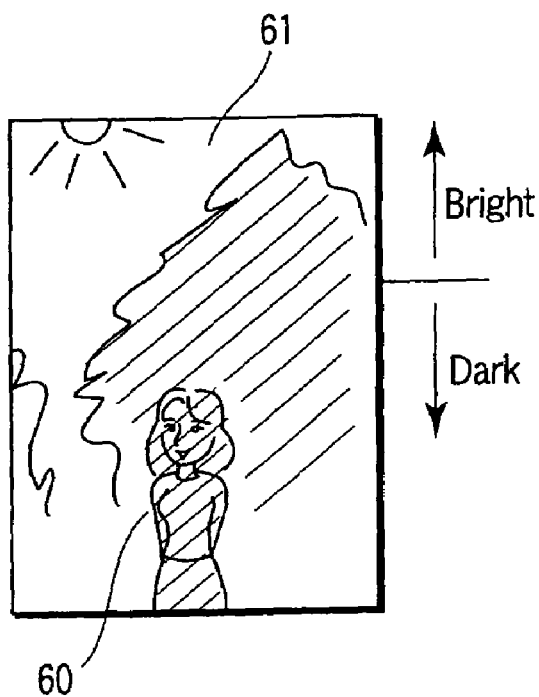
Figure 8B:
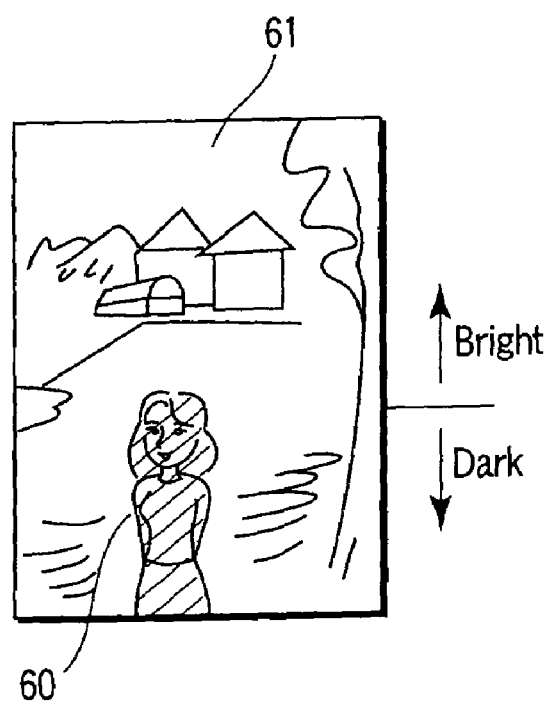
Figure 9:
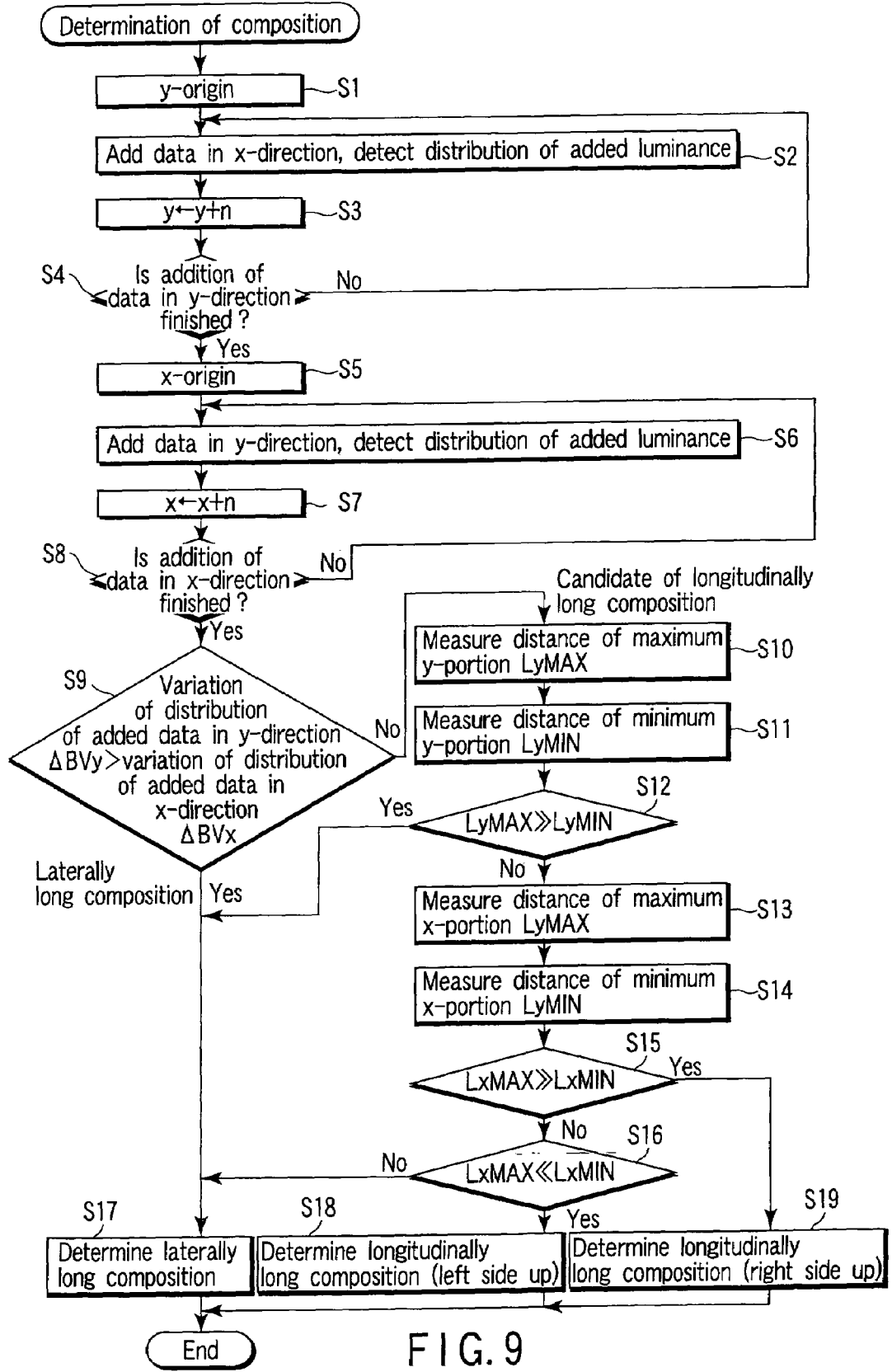
Figure 12:
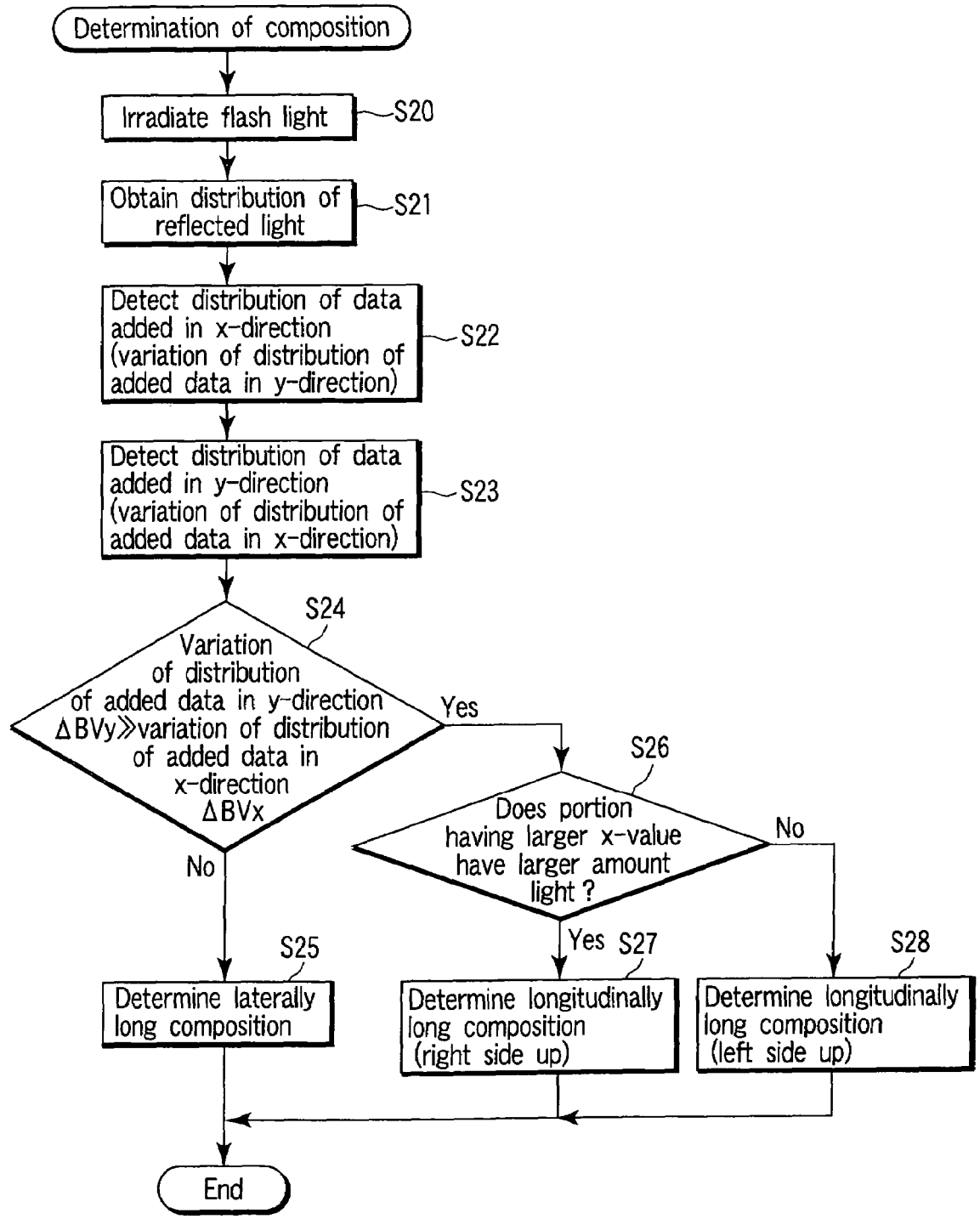
Figure 13:
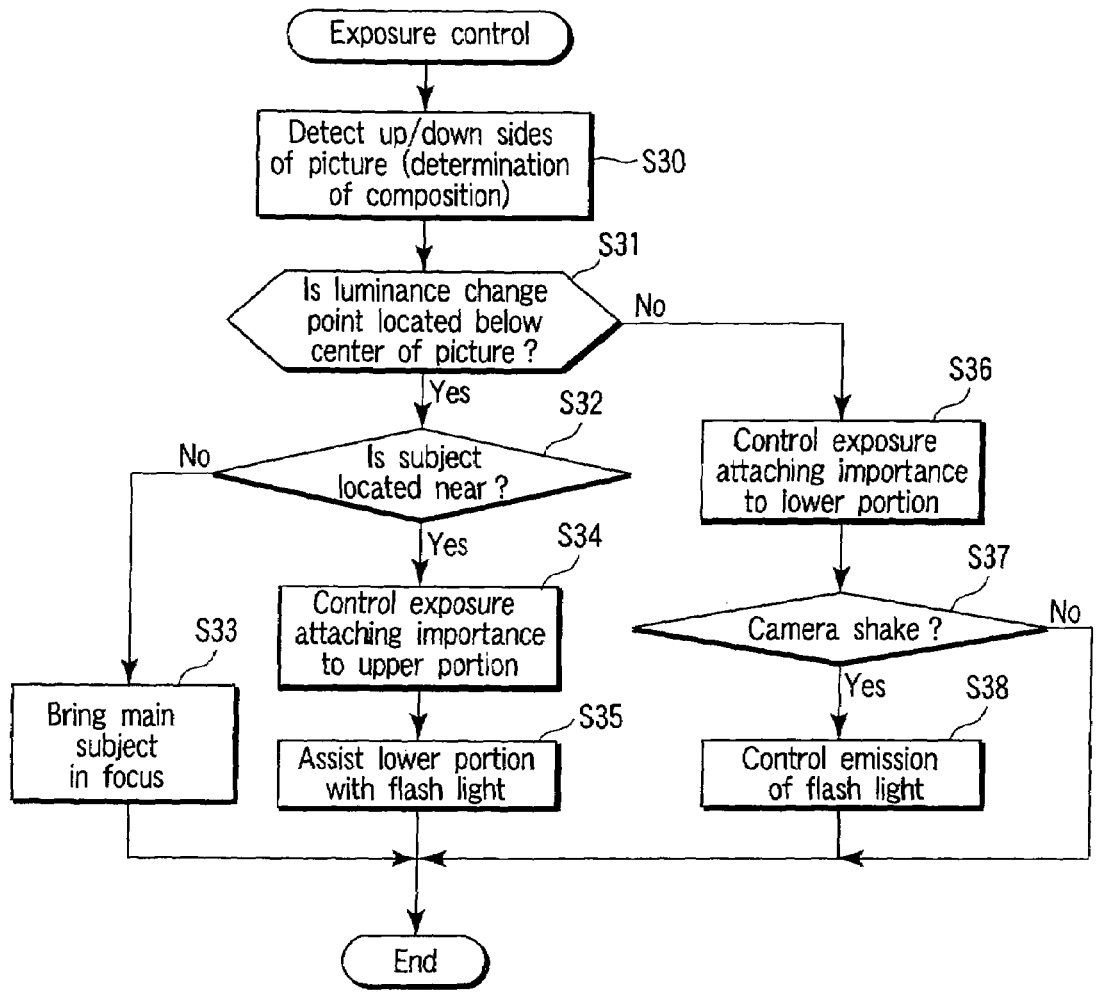
Figure 14:
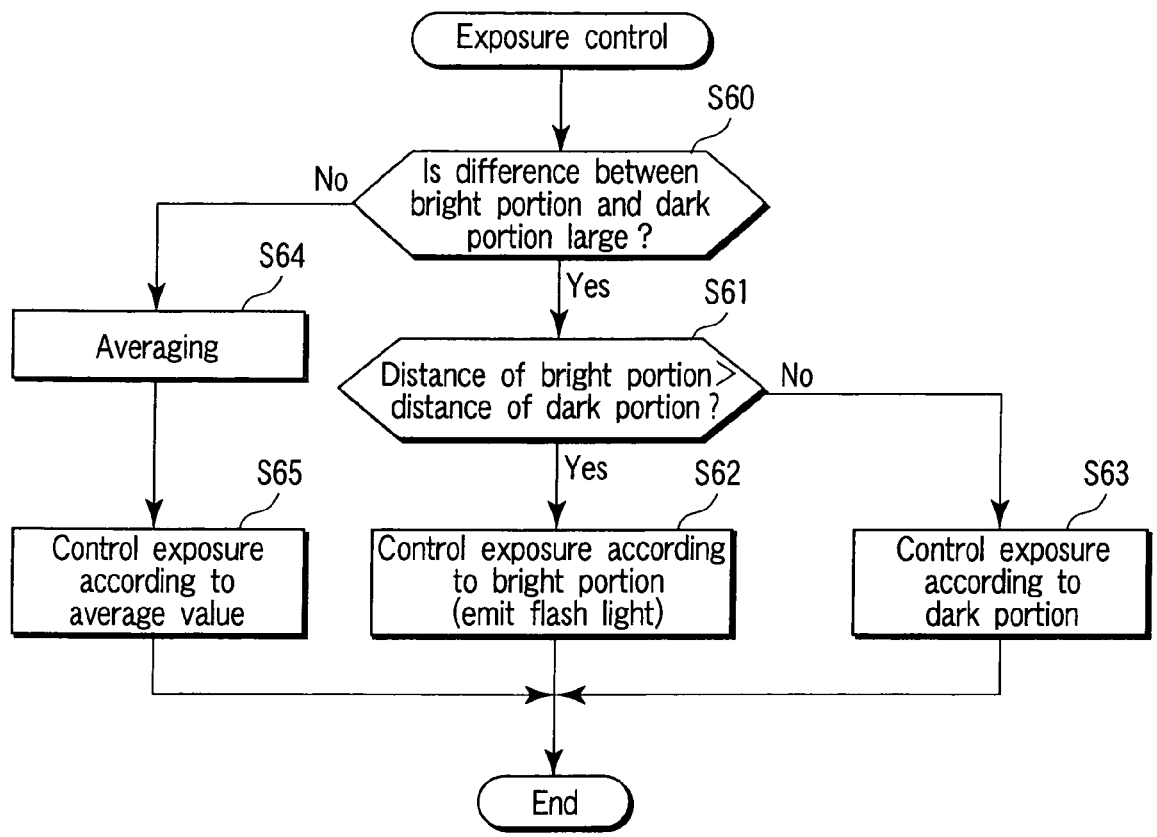
Figure 15:
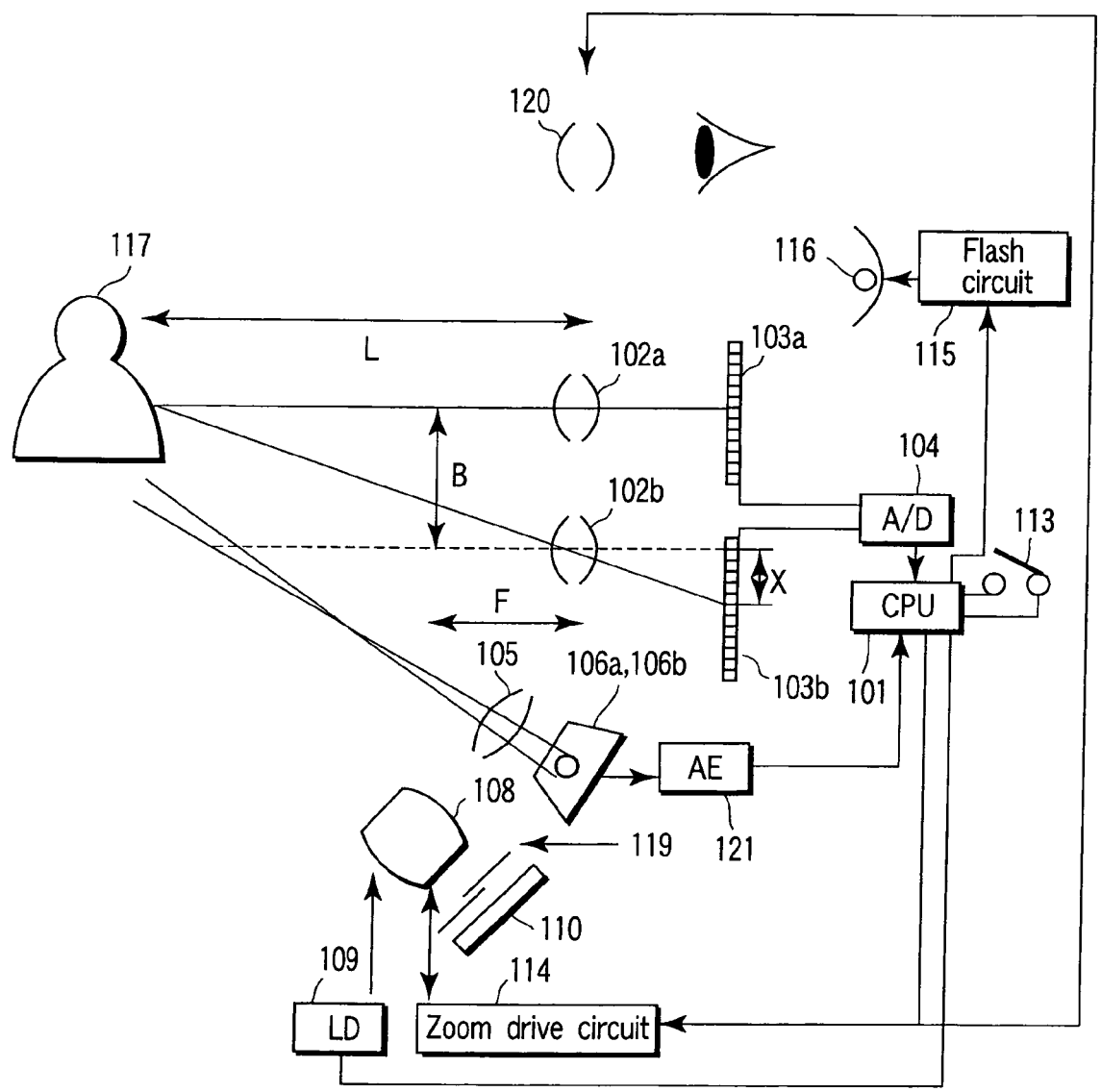
Figure 20A:
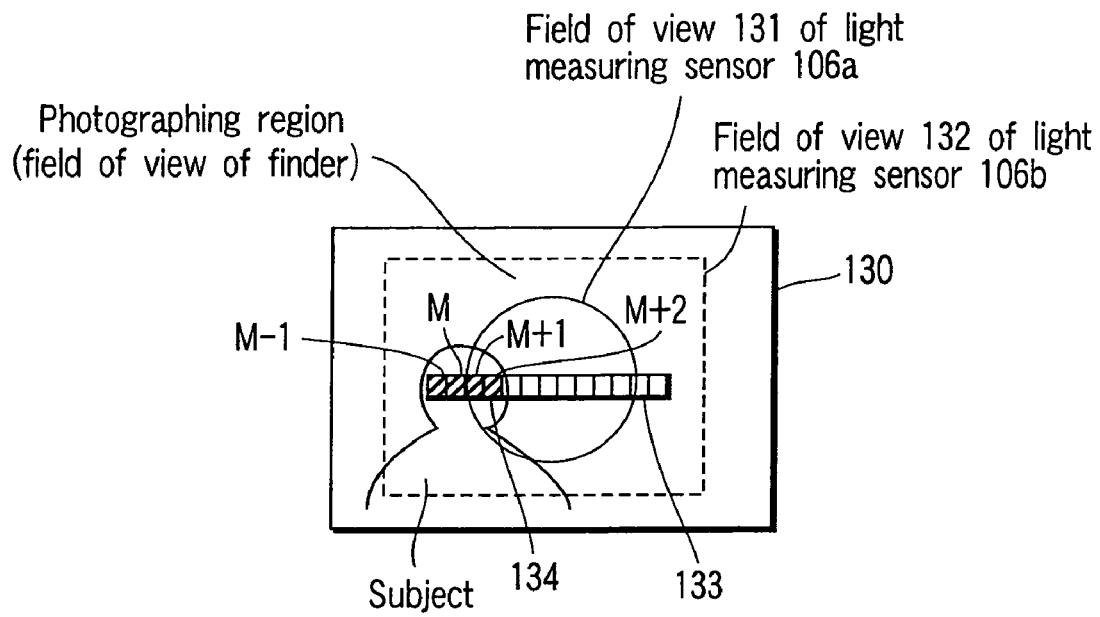
Figure 20B:
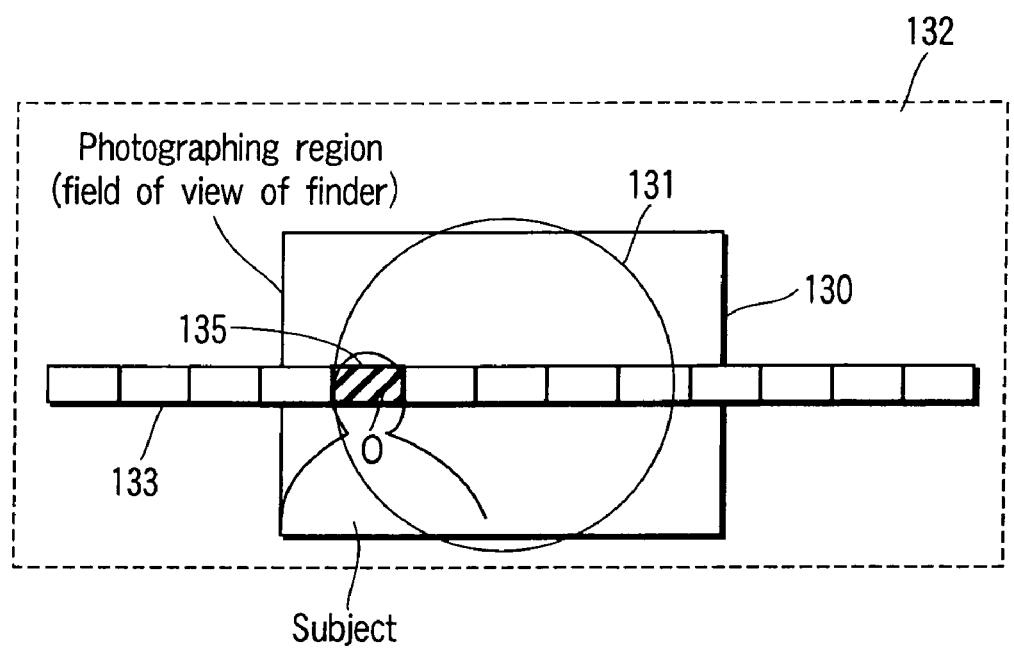
Figure 21:
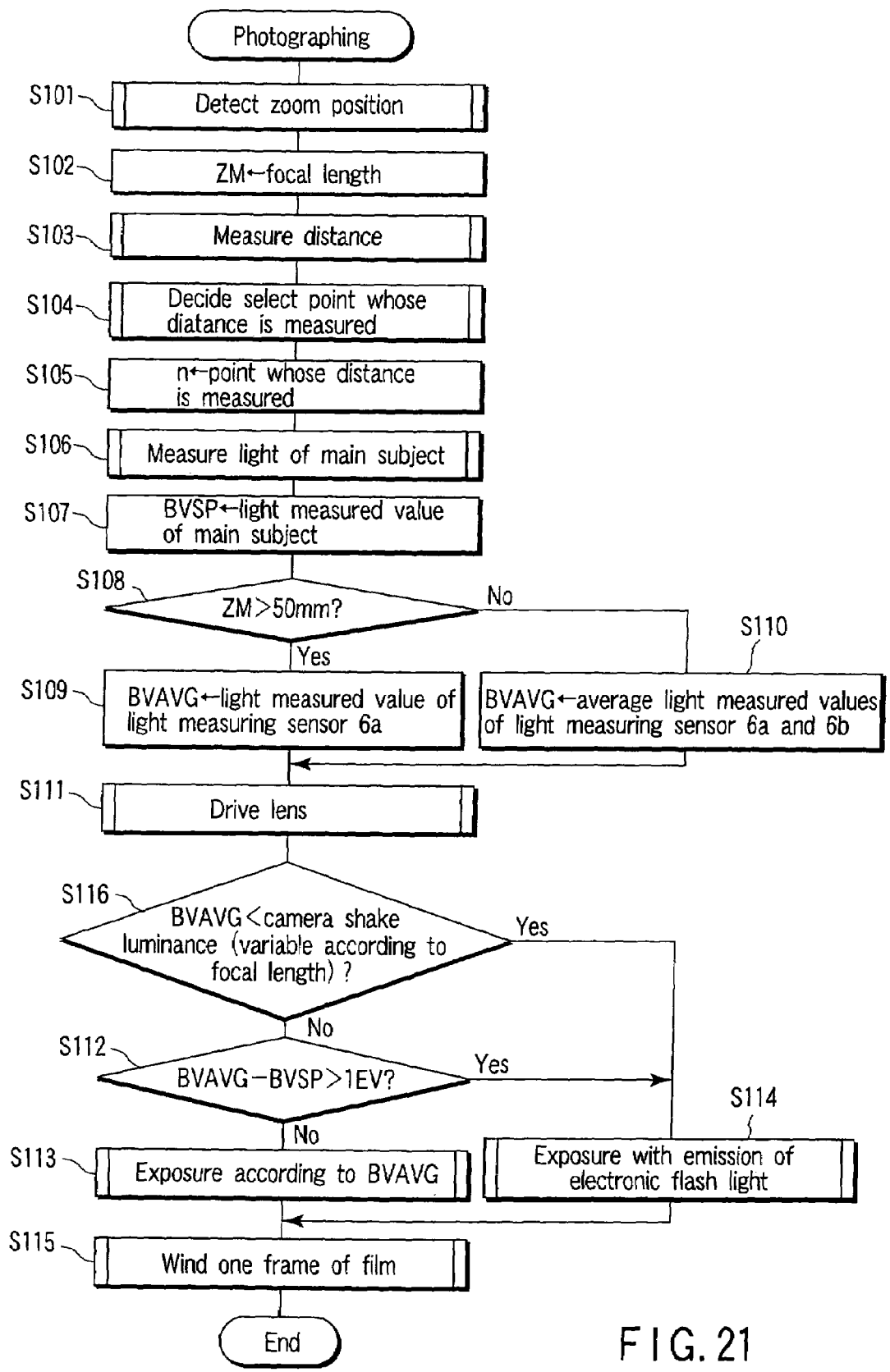
Figure 22:
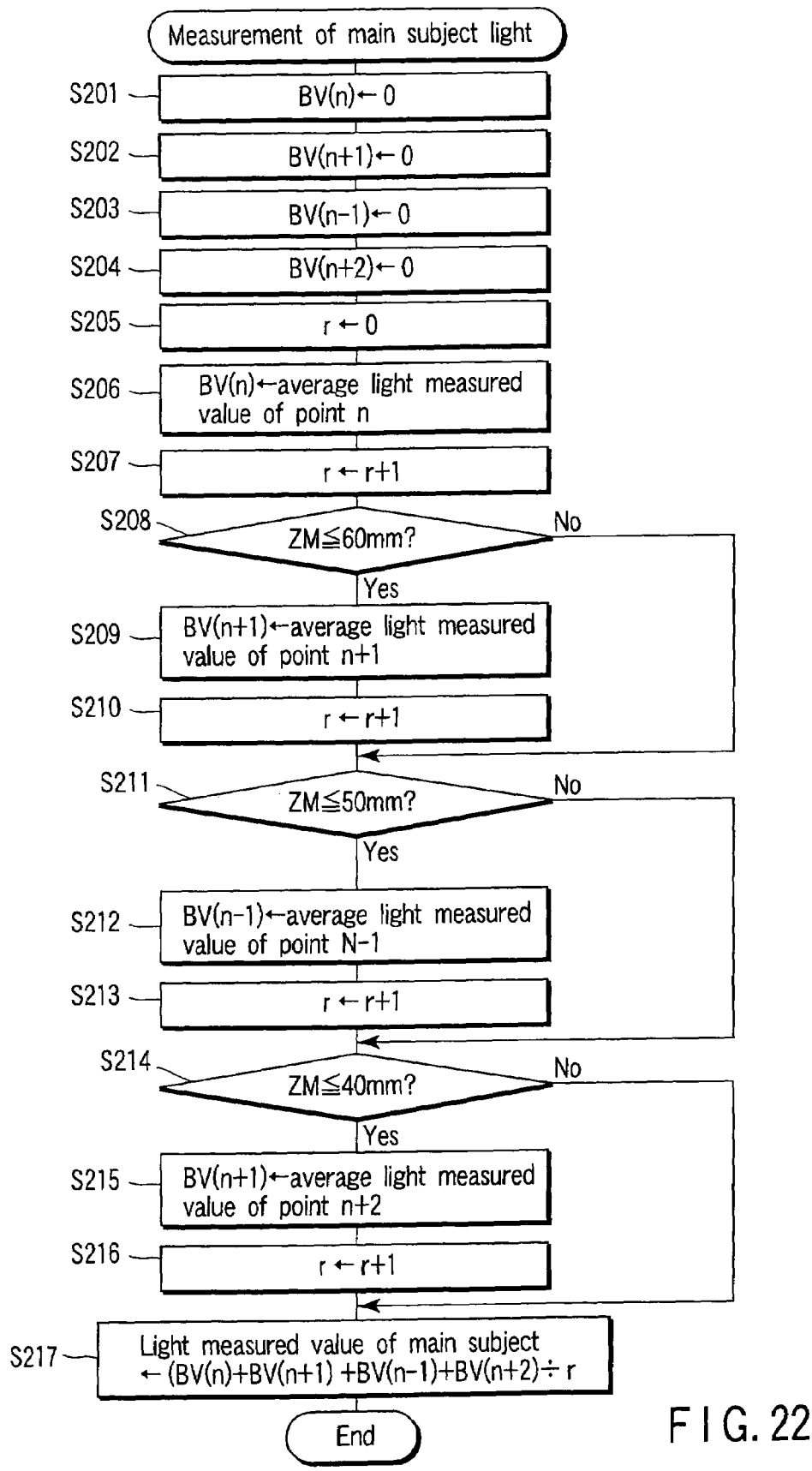
Figure 23A:
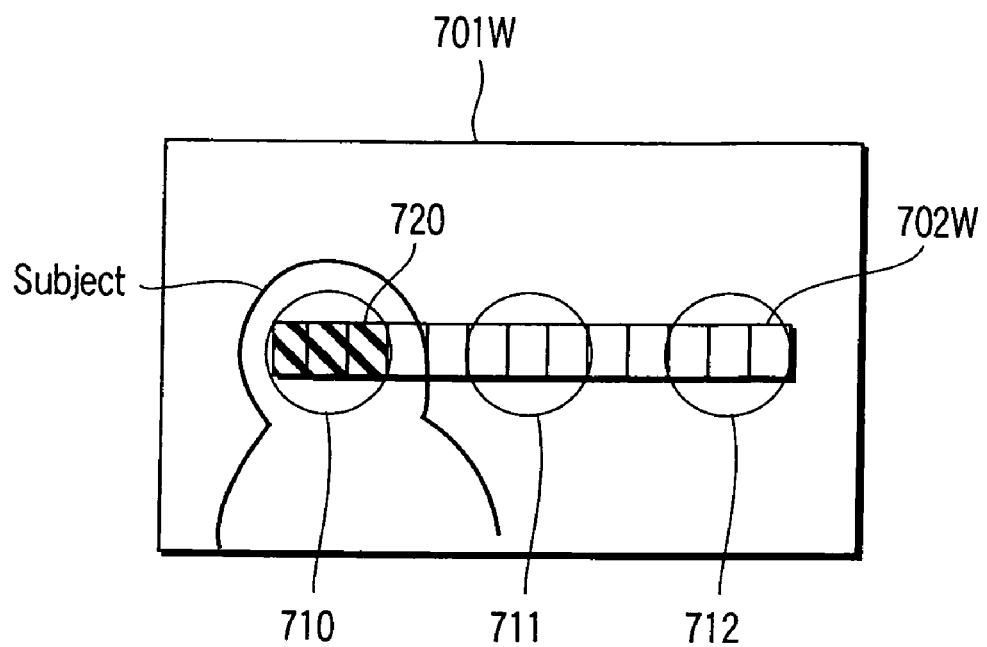
Figure 23B:
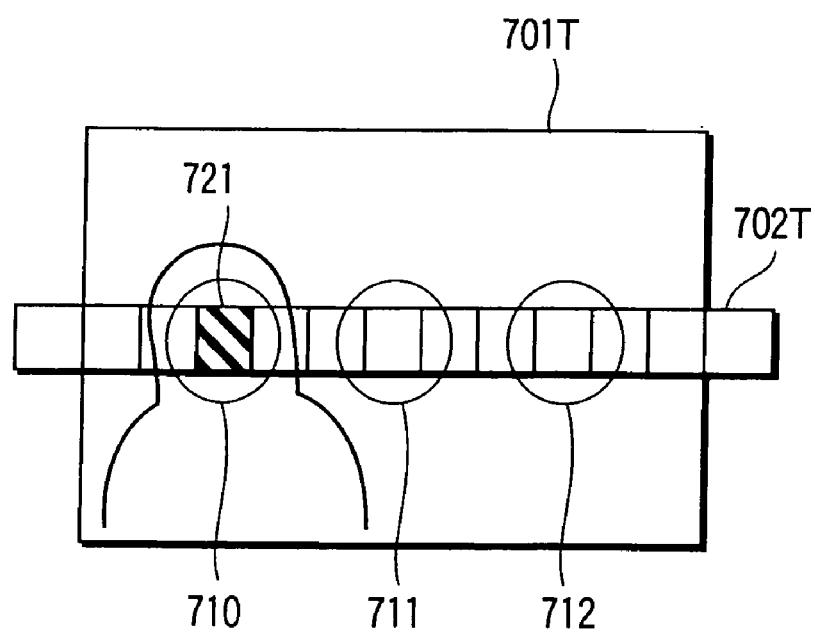

FIGS. 4A and 4B explain an embodiment in which a distance measurement possible region is expanded by additionally providing the sensor array shown in FIG. 2 in a base line length direction and in a vertical direction;

FIGS. 5A, 5B, and 5C explain an embodiment in which a distance measuring region is expanded to an overall photographing picture by area sensors used in place of the sensor arrays of FIG. 1;

FIGS. 6A, 6B, and 6C explain a schematic operation of the first embodiment of the present invention;

FIG. 7 is a flowchart for explaining a photographing operation of the first embodiment of the present invention;

FIGS. 8A and 8B explain a schematic operation of a second embodiment of the present invention;

FIG. 9 is a flowchart for explaining a composition determining operation according to the second embodiment of the present invention;

FIGS. 10A, 10B, and 10C explain an example of a method of detecting a change of brightness based on which the composition determining operation of FIG. 9 is executed;

FIGS. 11A, 11B, and 11C explain another example of the method of detecting the change of brightness based on which the composition determining operation of FIG. 9 is executed;

FIG. 12 is a flowchart for explaining another composition determining operation according to the second embodiment of the present invention;

FIG. 13 is a flowchart for explaining an example of an exposure control operation making use of the composition determining function of the present invention;

FIG. 14 is a flowchart for explaining an operation executed by a third embodiment of the present invention;

FIG. 15 is a block diagram showing a configuration of a main portion of a camera according to a fourth embodiment of the present invention;

FIG. 16 explains the relationship between a photographing field of view and a distance measuring field of view of the camera of FIG. 15;

FIGS. 17A, 17B, 17C, and 17D are diagrams explaining the relationship of distance measuring points of a distance measuring sensor of FIG. 15 and the relationship of the image data obtained from the respective distance measuring points;

FIGS. 18A and 18B are diagrams for explaining a specific example of the fourth embodiment of the present invention;

FIGS. 19A, 19B, 19C, and 19D show the photographing fields of view (photographing pictures, photographing ranges, or pictures observed by a photographer through a finder) of the specific example of FIGS. 18A and 18B (in this embodiment, a finder field of view is associated with a photographing field of view);

FIGS. 20A and 20B explain another example of the fourth embodiment of the present invention in more detail;

FIG. 21 is a flowchart for explaining a specific sequence when a camera having a zoom lens whose focal length is variable from 35 mm to 80 mm is used as a camera of the fourth embodiment of the present invention;

FIG. 22 is a flowchart for explaining the measurement of light of a main subject in a subroutine of FIG. 21; and FIGS. 23A and 23B show examples displayed in a finder to explain a finder display of the camera of the fourth embodiment of the present invention.

DETAILED DESCRIPTION OF THE INVENTION

Reference will now be made in detail to the embodiments of the invention as illustrated in the accompanying drawings, in which like reference numerals designate like or corresponding parts.

First Embodiment

A first embodiment of a camera according to the present invention will be explained with reference to the drawings.

First, a configuration, based on which the camera of the first embodiment is applied, will be explained.

FIG. 1 is a function block diagram showing the configuration of the camera to which the first embodiment of the present invention is applied.

A method of determining a subject distance L, when the focus of the camera is adjusted, will be explained.

In FIG. 1, reference numerals 3a and 3b denote a pair of light receiving lenses disposed with a parallax B set therebetween.

An image of a subject 5 is focused on sensor arrays 2a and 2b by the pair of light receiving lenses 3a and 3b.

The image of the subject 5 is focused at different relative positions on the sensor arrays 2a and 2b by the parallax B according to a principle of triangulation.

When the difference x between the relative positions is detected, the subject distance L can be determined by calculating a formula $L=(B \cdot f)/x$ according to the focal length f of the light receiving lenses and the parallax B.

After the subject distance L is determined, an arithmetic control unit (CPU) 1, including a one chip microcomputer and the like, controls a focusing unit 4 for adjusting the focus of a photographing lens 11 according to the determined subject distance L.

With this operation, the subject 5 can be photographed in focus.

In photographing, the subject image is captured into the camera through the photographing lens 11 and photographed by an image pick-up element 12.

The photographed subject image is converted into a digital signal by an A/D converter 13 and input to an image processing unit 14 controlled by the CPU 1.

The subject data subjected to predetermined image processing in the image processing unit 14 is stored in a memory 15.

Further, the subject data is displayed on a display unit 16 if necessary.

Note that, in FIG. 1, reference numeral 1a denotes a photographing button.

The difference x between the relative positions is calculated by a method described below.

First, the outputs from the respective sensors of the sensor arrays 2a and 2b are converted into digital signals by an A/D converter 2c disposed in the CPU 1, and the digital signals are stored in a memory (not shown) of the CPU 1.

The CPU 1 calculates correlation through a correlation calculation unit 2e employing a predetermined program by the use of the above result. At this time, the difference between the outputs from the two sensor arrays is determined while displacing the outputs in a direction where the sensor arrays 2a and 2b are arranged, and it is determined that "correlation" is high depending upon an amount of displacement of the outputs when the difference between the outputs is minimized.

The amount of displacement and the pitch of the sensor arrays 2a and 2b are values representing the difference x between the relative positions.

FIG. 2 is a diagram showing a configuration of a portion of the sensor arrays 2a and 2b in detail.

In FIG. 2, reference numerals S1 to S4 denote light receiving surfaces of light receiving elements that form the sensor arrays 2a and 2b.

The respective light receiving surfaces S1 to S4 are supplied with power from a bias circuit 100.

The light receiving surfaces S1 to S4 of the respective sensors output current signals according to amounts of received light, respectively.

When the integration start/end switches of switch unit 7a are turned on, these signal currents are introduced to integration amplifiers A1 to A4.

Further, when the reset switches of a switch unit 7b are turned off, the integration amplifiers A1 to A4 output voltage signals according to the amounts of received light.

When the result of the above signals is read by the A/D converter 2c incorporated in the CPU 1, focusing is executed through the calculation of correlation explained in FIG. 1.

However, since the amounts of light incident on the light receiving surfaces S1 to S4 of the respective sensors are dispersed to various values depending upon the brightness of a scene and the color and the reflectance of a subject, an accurate integration control technology is required to set an amount of integration to a proper value by an integration means having a limited dynamic range.

When, for example, an integration time is too short, no difference is obtained because a result of integration is made flat.

Further, when the integration time is too long, no difference is obtained because a result of integration is made uniform due to the saturation of a circuit.

As apparent from the calculation of correlation explained above, when an image varies only slightly, it is difficult to obtain correlation between two images obtained by the two sensor arrays 2a and 2b. As a result, a distance cannot be correctly measured.

To cope with the above problems, the CPU 1 monitors a result of integration in real time, and integration is finished when a proper integration level is achieved.

A maximum integral value detection circuit 6 detects a maximum integral value of the integral outputs that are input from the light receiving surfaces S1 to S4 of the respective sensors each time the switches of a switch unit 7c are turned on and off.

FIG. 3A shows a timing chart when integral control is executed by an integration controller 2d by turning on and off the switches of the switch unit 7c.

When light is incident on the light receiving surfaces S1 to S4 of the respective sensors, the reset switches of the switch unit 7b are turned on to reset outputs to a reference level first, and then the integration start/end switches of the switch unit 7a are turned on and the reset switches of the switch unit 7b are turned off, thereby integration is started at timing of T1.

When an A/D selection switch 8 is connected to the maximum integral value detection circuit 6, a sensor output having a maximum integral amount (maximum value) is selected from the maximum integral value detection circuit 6 and input to the A/D converter 2c of the CPU 1.

The CPU 1 sequentially monitors the output by driving the A/D converter 2c (FIG. 3A).

That is, the CPU 1 turns off the integration start/end switches of the switch unit 7a at timing T2 at which the maximum value does not exceed the dynamic range of the circuit, thereby the CPU 1 monitors the integral outputs from the respective sensors so that they do not exceed the dynamic range.

After the integration is stopped, the CPU 1 changes over the A/D selection switch 8 and subjects the integral outputs from the light receiving surfaces S1 to S4 of the respective sensors to A/D conversion, thereby the CPU 1 can sequentially monitor the outputs from the respective sensors.

An image signal obtained as described above has a shape as shown in FIG. 3B and exhibits a low output at a dark portion and a high output at a bright portion according to an incident state of light.

A distance measuring device of the camera can obtain a proper image signal by the method described above.

Note that when light beams shown by dotted lines from the light receiving lens 3a are used in the configuration of FIG. 1, the distances of points other than a point (c) at the center of a photographing picture, that is, the distances of points (L), (R) displaced in the base line length direction can be also measured.

Further, when each two sets of sensor arrays 2a and 2b are additionally provided above and below the sensor arrays 2a and 2b in a direction vertical to the base line length direction behind the light receiving lenses 3a and 3b as shown in FIG. 4A, the distances of portions (U) and (D) in the direction vertical to the base line length direction can be measured as shown by light beams in FIG. 4A.

Accordingly, the monitor regions of the sensor arrays are expanded as shown in FIG. 4B, and the distances of more points in the photographing picture can be measured.

When this concept is expanded, the overall area in a photographing picture can be thoroughly monitored by using so-called area sensors having sensors arranged continuously therein as shown in FIG. 5A, instead of one or three line sensor units.

It is possible to increase measurement possible points to, for example, 30 points or more as shown in FIG. 5B.

When the number of distance measurement points is increased by the feature as described above, the distance of a subject can be correctly measured even when it is located at any point in a photographing picture.

For example, even when a person is located at an edge of a photographing picture in a composition shown in FIG. 5C, there can be obtained a camera which can accurately execute focusing.

Further, since the outputs from the respective sensors show the brightness and darkness of respective points in the photographing picture, the sensors may be regarded as luminance distribution sensors in the photographing picture.

An operation of the camera according to the first embodiment of the present invention will be explained below with reference to FIGS. 6A, 6B, and 6C based on the configuration described above.

In a scene as shown in FIG. 6A, it is preferable to obtain an image in which the color hues of not only a person 50 but also a landscape 51 outside of a window are reproduced while they may be in focus somewhat differently.

When exposure is executed on the person 50 because the person is a main subject, the landscape 51 outside of the window cannot be covered by a latitude and is not reproduced well in a photograph. Thus, an image having a very poor atmosphere is created.

In this type of photograph, a created image is unchanged even when the subject is located at any point, thus it is not preferable as a commemorative photograph taken on a journey.

To cope with the above problem, in the first embodiment, the distribution of brightness and darkness in a photographing picture is represented by binary digits as shown in, for example, FIG. 6C by determining the distribution of brightness in the photographing picture, it is determined which of a bright portion and dark portion occupies a larger area in the photographing picture, and exposure is controlled by an exposure controller 10 based on the determination.

In the present invention, however, the distribution of brightness and darkness is determined only when a scene has a change of brightness exceeding a predetermined level because there may be scenes in which a large difference does not exist between a bright portion and a dark portion.

FIG. 7 is a flowchart for explaining a processing operation executed by the camera of the first embodiment.

In steps S40 to S41, the distribution of distances of subjects is detected by the distance measurement device explained above.

Next, the point exhibiting a nearest distance of three points 52, 53, and 54 in the photographing picture shown in FIG. 6C is used as a point representing a subject distance, and the position of this point is detected in step S42.

It is determined in step S43 and subsequent steps whether or not brightness in the photographing picture (difference between bright portion and dark portion) greatly varies to examine the distribution of brightness as described above.

A method of detecting the change of brightness will be described later in detail with reference to FIGS. 10A, 10B, and 10C and FIGS. 11A, 11B, and 1C.

When it is determined in step S43 that the difference between bright portion and dark portion ($\Delta BV$ of FIGS. 10B and 11B) is small, the process branches to step S58, at which after the subject distance L is brought into focus, proper exposure control is executed according to averaged brightness (step S59).

Further, when it is determined in step S43 that the difference between bright portion and dark portion is large, step S43 branches to step S44 in which it is determined whether or not a bright portion has a large area.

When it is determined that the area of the bright portion is large in step S44, it is determined that the scene is as shown in FIG. 6A and that a color hue at the bright portion is basically important. Thus, the process goes to step S45 and exposure is controlled so that this portion is properly exposed.

Note that since optimum exposure control changes according to color, when the present invention is applied to a digital camera, the color tone of a bright portion may be detected by image pick-up elements, and the result of detection may be reflected.

When exposure is executed on priority to brightness, subjects such as the persons shown in FIGS. 6A and 8B are made dark by counterlight. Thus, it is determined in step S45 whether or not a main subject is located in a dark portion, and when the determination is "YES", after the subject distance L is brought into focus (step S46), although exposure may be controlled according to the bright portion, exposure is executed on the dark portion by emitting flash light in step S47 because the main subject is in a counterlight state.

In contrast, when it is determined in step S45 that the main subject is not located in the dark portion, the process branches to step S51 in which after the subject distance L is brought into focus, exposure control is executed on a bright portion (step S52).

In contrast, when it is determined in step S44 that the area of the bright portion is small, step S44 branches to step S54 in which it is determined whether or not the main subject is located in the dark portion, and after the subject distance L is brought into focus, the exposure control is executed attaching importance to the main subject (steps S55 and S56).

That is, when the determination in step S54 is "YES", the subject distance L is brought into focus (step S55) and the exposure control is executed on the dark portion (step S56).

Further, when the determination in step S54 is "NO", the subject distance L is brought into focus (step S51), and exposure control is executed on the bright portion (step S52).

A scene as shown in FIG. 8A is assumed here, and exposure control is executed on a person 60 based on sky portion 61 in a background being less important.

As described above, according to the first embodiment, since the exposure control is executed in consideration of not only the brightness and darkness of a main subject but also the ratio of a bright portion to a dark portion, there can be taken a photograph having a sufficient atmosphere and attaching importance to the color hue of the portion having a larger area.

Second Embodiment

In a camera having area sensors as shown in FIG. 5A, it is possible to determine, when the camera is aimed, whether a photographing picture is longitudinally long or laterally long by a method described below.

As apparent from FIGS. 8A and 8B, an upper portion 61 of a photographing picture is not only bright but also located at a position more distant from a main subject 60 in many cases.

Thus, in the second embodiment, it is determined whether the camera is aimed in photographing so as to arrange a photographing picture laterally long or longitudinally long making use of the area sensors in consideration of the distribution of brightness and the distribution of distances in the photographing picture.

FIG. 9 is a flowchart for explaining an example of operation for detecting whether a camera is aimed to take a laterally long photograph or a longitudinally long photograph (for detecting a composition) by means of auto focusing (AF) using the area sensors of the second embodiment.

This processing flow is controlled by a CPU 1, and the CPU 1 changes a camera control method based on a result of control.

The processing flow is arranged by a concept based on scenes shown in FIGS. 10A and 11A.

That is, when a long direction of the photographing picture of the scene is called an x-direction and a short direction thereof is called a y-direction, the scene shown in FIG. 10A is arranged such that the y-direction corresponds to an up/down direction.

When the pixel data of the same y-coordinates of area sensors as shown in FIG. 5A are added along the y-direction, the distribution of the added values of the pixel data exhibits a significant variation ($\Delta BV$) as shown in FIG. 10B because a sky is bright.

In contrast, when the pixel data of the same x-coordinates are added along the x-direction which corresponds to a right/left direction, the distribution of the added values of the pixel data exhibits a poor change (FIG. 10C).

In the scene shown in FIG. 11A, however, even when the values obtained by adding the pixel data of the same y-coordinates along the y-direction are examined contrary to the above, the distribution of the added values of the pixel data does not exhibit a significant change because a sky, buildings on a ground, and a person are mixed with each other (FIG. 11C).

Different from the above, when the pixel data of the same x-coordinates are added along the x-direction, a distinct variation of luminance is observed because the sky is bright and the ground is dark, thereby a large variation of data is exhibited as shown by $\Delta BV$ likewise (FIG. 11B).

As described above, a composition (whether a photographing picture is lateral long or longitudinal long) can be determined by examining the distribution of the added values of the pixel data added in the x-direction or in the y-direction.

Steps S1 to S4 of FIG. 9 show a flow for adding data of the same y-coordinates in the x-direction from a point of origin to a point of termination in the y-direction and examining the distribution of luminance of the data.

In step S3, the distribution of luminance is examined as to the overall range of a photographing picture by incrementing the values of the y-coordinates by n.

Here, the discrete values of the y-coordinates are added in consideration of the processing speed of the CPU 1.

In steps S5 to S8, the same processing is executed as to the x-direction.

In the flow in step S9 and subsequent steps, it is determined whether the camera is aimed in a longitudinally long composition or in a laterally long composition by comparing a maximum variation $\Delta BVy$ of the added values added along the y-direction with a maximum variation $\Delta BVx$ of the added values added along the x-direction (step S9).

An ordinary photograph is arranged in the laterally long composition in correspondence to that a person has two eyes arranged laterally. Thus, when the distribution of the added values largely changes in the y-direction, the process instantly branches to step S17 in which it is determined that the photograph is arranged in the laterally long composition.

Otherwise, it is determined that there is a possibility that the photograph is arranged in the longitudinally long composition, and the process branches to step S10 in which the distribution of distances is taken into consideration.

While the distribution of brightness can be easily determined, it is difficult to determine the distribution of distances. Thus, only the extreme end portions of the area sensors are used to determine the distribution of distances.

To further narrow down the distribution of distances, distances may be determined near the centers of both the ends of the area sensors in the x- and y-directions.

The distances are determined in steps S10 and S11, and S13 and S14, and a composition is determined based on a concept that a portion from which long distance data is output corresponds to an upper portion in an up/down direction.

Whether or not there is a large difference between the distances at both the ends in the y-direction is determined in step S12, and when the determination is "YES", the process branches to step S17 in which it is determined that the photograph is arranged in the laterally long composition.

Whether or not there is a large difference between the distances at both the ends in the x-direction is determined in steps S15 and S16, and when the difference between the distances is small, the process branches to step S17.

However, when there is a large difference between the distances, it is determined in steps S18 and S19 that the photograph is arranged in the longitudinally long composition.

When the photograph is arranged in the laterally long composition, which of a left direction and a right direction is arranged as an upper side can be determined in step S15 or S16.

FIG. 12 is a flowchart showing a flow for determining a composition when a peripheral area is dark.

When the peripheral area is dark, a flash circuit 9 shown in FIG. 1 is controlled and light is projected from a light emitting unit 9a (step S20), and a composition can be determined by the same concept using the distribution of reflected light obtained from the area sensors at the time (step S21).

Steps S22 and S23 correspond to steps S1 to S4 and steps S5 to S8 of FIG. 9 and similar processing is executed except that the distribution of reflected light is determined in place of the distribution of luminance.

Whether or not the distribution of reflected light in the x-direction varies much more than that in the y-direction is determined in step S24, and when the determination is "YES", it is determined that the photograph is arranged in the longitudinally long composition (steps S26, S27, and S28), whereas when the determination is "NO", it is determined that the photograph is arranged in the laterally long composition (step S25).

Since reflected light is more intense at a shorter distance, an up/down relation is determined by branching to steps S27 and S28 based on a concept in step S26 that a portion having a larger amount of light is located at a short distance and a portion having a small amount of light is located at a long distance (upper direction).

According to the above concept, since the distribution of brightness (reflected light) corresponds to the distribution of distances as it is, a composition can be determined at high speed by the flow of FIG. 9.

In this case, the composition may be determined diverting image pick-up elements in place of dedicated sensors.

FIG. 13 is a flowchart for explaining an example of exposure control making use of the composition determining function described above.

In the camera of the second embodiment, attaching importance is placed on whether or not the color of a sky is to be brought out.

That is, first, the up/down direction of the photographing picture is detected by the method described above based on the concept that the sky exists in a bright direction (step S30).

Next, whether a point, at which the brightness varies (a point of variation of luminance) (the points ΔBV of FIGS. 10B and 11B), is located above or below the center of the photographing picture is determined in step S31. When the point is located below the center of the photographing picture, it is conceived that the photographing picture shows a scene as shown in FIG. 8B because a bright portion is large, and it is determined whether or not a subject distance is short (step S32).

When the determination is "YES", step S32 branches to step S34 in which exposure control is executed attaching importance to an upper portion (bright portion).

The exposure of a person located in a lower portion is assisted by flash light (step S35).

When the determination in step S32 is "NO", that is, when the person is located at a position to which the flash light does not reach, step S32 branches to step S33 in which exposure control is executed on the brightness of the main subject.

Further, when it is determined in step S31 that the point of variation of luminance is located above the center of the photographing picture, the photographing picture shows a scene as shown in FIG. 8A. Thus, exposure control is executed placing attaching importance to the lower portion of the photographing picture (step S36), and flash light is emitted (step S37) according to circumstances, that is, depending upon whether or not camera shake arises (step S38).

As described above, according to the second embodiment, exposure control can be executed attaching importance to a circumferential atmosphere such as the color of a sky portion and the like in consideration of the up/down direction of a photographing picture.

Third Embodiment

A third embodiment of the present invention will be explained with reference to FIG. 14.

The third embodiment is characterized in that the distribution of distances of subjects is combined with determination of the distribution of brightness and darkness in a photographing picture that is a feature of the present invention.

First, it is determined in step S60 whether or not a difference of luminance (a difference between bright portion and dark portion) is large.

When the difference of luminance is large, it is determined whether or not the distance of a dark portion is shorter than the distance of a bright portion (step S61). When the determination is "YES", the brightness of the dark portion is assisted by the emission of flash light at the time exposure control is executed according to the bright portion (step S62).

In this case, the flash light does not reach to the bright portion because the distance of the bright portion is long. Thus, the bright portion is not influenced by the flash light.

Accordingly, the exposure control can be executed while suppressing brightness within a latitude.

Further, when the determination in step S61 is "NO", flash light cannot be effectively used because the difference of luminance is increased by the emission of flash light.

In this case, it is conceived that a far subject is a main subject as shown in FIG. 8B, and exposure is executed on the dark portion (step S63).

Further, when the determination in step S60 is "NO", luminance is averaged (step S64), and exposure control is executed using an average luminance value obtained thereby (step S65).

According to the third embodiment, an image having good color reproducibility can be obtained by reducing the difference between brightness of an overall photographing picture making use of that flash light can be effectively utilized to a near and dark subject.

According to the first to third embodiments described above, since an exposure control method is decided by determining the distribution of brightness in a photographing picture, there can be realized a camera capable of obtaining an image in which the color reproducibility of an overall photographing picture is excellently maintained.

Fourth Embodiment

FIG. 15 is a block diagram showing a configuration of a main portion of a camera according to a fourth embodiment of the present invention.

FIG. 15 shows a block diagram of a so-called lens shutter type film camera for recording a subject image captured through a photographing lens 108 on a film 110.

A CPU 101 is a control means including, for example, a one-chip microcomputer and the like and sequentially controls the camera in its entirety.

When a photographer manipulates a switch input unit 113, the CPU 101 executes processing for taking a photograph according to a predetermined sequence.

Two light receiving lenses 102a and 102b are disposed at positions separated from each other by a base line length B and act as a distance measuring means for measuring the distance of a subject 117. Subject image signals obtained through the light receiving lenses 102a and 102b are photoelectronically converted by a pair of sensor arrays 103a and 103b and then subjected to A/D conversion by the A/D converter 104, thereby the subject image signals are converted into a pair of digital image signals.

The CPU 101 determines the relative positional difference X of image input signals by comparing the pair of digital image signals.

That is, the relative positional difference X varies according to an expression X=BF/L, where L is a subject distance, F is the focal distance of the light receiving lenses 102a and 102b, B is the base line length. Thus, when the value of X is detected, the CPU 101 can calculate a focusing distance L.

The sensor arrays 103a and 103b are of, for example, a non TTL-AF (non through-the-lens auto-focusing) type and extend in a horizontal direction of the camera, and when the camera is aimed at a subject scene as shown in FIG. 16, it monitors a region 123a.

The overall monitor region 123a is divided into 13 blocks as shown in FIG. 17A, and the distances of 13 points in a photographing picture can be measured by detecting the relative positional differences X described above using the image signals of the respective blocks.

Of these 13 distance measuring signals, a signal, which exhibits, for example, a nearest distance, shows the distance of a main subject.

In the fourth embodiment, a photographing optical system including the photographing lens 108 acting as a zoom lens, a distance measuring optical system (the light receiving lenses 102a and 102b), and a light measuring optical system (an automatic exposure (AE) lens 105) are disposed separately.

When a manipulating member (not shown) is manipulated by the photographer, the CPU 101 drives the photographing lens 108 through a drive circuit 114 so that the focal length of the photographing lens 108 is moved from a wide-angle side to a telescopic side.

With this operation, the camera of the fourth embodiment can change a photographing picture angle and a photographing field of view.

The camera is provided with a finder optical system 120 so that the photographer confirms a photographing picture therethrough.

The finder optical system 120 operates in association with the focal length of the photographing lens 108.

That is, the finder optical system 120 is also driven in accordance with the movement of the focal length of the photographing lens 108 from the wide-angle side to the telescopic side, thereby the focal length is changed from the wide-angle side to the telescopic side.

Since the field of view of the finder is designed so as to coincide with the field of view the photographing lens 108 regardless of the focal length, the photographer can confirm a photographing range (field of view) by observing a subject through the finder optical system 120.

Since the photographing optical system is disposed separately from the distance measuring optical system as described above when, for example, the photographing lens 108 is located on the wide-angle side, the photographing field of view is set as shown by 124W in FIG. 16, and the fields of view of the sensor arrays 103a and 103b are set as shown by 123a in FIG. 16.

Further, when the photographing lens 108 is located on the telescopic side, the photographing field of view is set as shown by 124T in FIG. 16.

In contrast, since the distance measuring optical system is composed of a fixed lens that is not associated with the focal length of the photographing lens 108, the fields of view of the sensor arrays 103a and 103b are not changed. Thus, the relationship between the photographing field of view and a distance measuring field of view is represented by 124T and 123a.

When the photographing field of view is set as shown by 124W of FIG. 16, 13-points multi-auto-focusing (multi AF) is executed in the 13 regions of a distance measuring sensor 123a as shown in FIG. 17A.

When the photographing field of view is set as shown by 124T of FIG. 16, 7-points multi-auto-focusing (multi AF) is executed in seven regions of the 13 points of the distance measuring sensor 123a as if it was a distance measuring sensor 123b as shown in FIG. 17B.

As shown in FIG. 15, there are provided divisional type light measuring sensors 106a and 106b for receiving light through the AE lens 105.

The brightness in a photographing picture is measured by converting the outputs from the light measuring sensors 106a and 106b by an AE circuit 121 including a logarithmic compression circuit, thereby the CPU 101 executes exposure control.

The light measuring optical system is also disposed separately from the optical system of the photographing lens 108 and is not associated with the focal length of the photographing lens 108.

Accordingly, when the respective fields of view of the photographing lens 108 on the wide angle side and on the telescopic side are shown by 124W and 124T, the relationship between the field of view 126a of the light measuring sensor 106a and the field of view 126b of the light measuring sensor 106b is as shown in FIG. 16.

With this configuration, when the photographing lens 108 is located on the telescopic side, the output from the sensor 106a is used, whereas when it is located on the wide angle side, the sum of the outputs from the sensors 106a and 106b is used, thereby the light of the portion approximately similar to the photographing field of view can be measured.

Each of the distance measuring points, which are divided into the 13 regions as shown in FIGS. 17A and 17B, is composed of strip-shaped pixels as shown in FIG. 17C, and each pixel outputs data in accordance with the light and shade of an image. Thus, image data as shown in FIG. 3D can be obtained.

The average luminance of each distance measuring point can be determined by averaging the thus obtained image outputs.

With this configuration, the position of the main subject can be detected by the multi-auto-focusing and moreover the luminance of the position can be determined. Accordingly, photographing can be executed with exposure control attaching importance to the main subject based on a processing flow shown in FIG. 21 which will be described later in detail.

Note that light measurement using the distance measuring sensors will be described later.

The CPU 101 controls the photographing lens 108 through a photographing lens control circuit (LD) 109 based on the result of measurement executed by the multi-auto-focusing, brings the subject into focus, and opens and closes a shutter 119 using the result of light measurement executed by the distance measuring sensors 103a and 103b and the result of light measurement executed by the light measuring sensors 106a and 106b.

With this operation, the camera of the fourth embodiment can take a photograph by controlling exposure attaching importance to the main subject.

In the exposure control, an electronic flash 116 is emitted by controlling a flash circuit 115 by the CPU 101 when necessary.

FIGS. 18A and 18B are diagrams showing specific examples of the fourth embodiment of the present invention, and features of the embodiment will be explained in detail with reference to FIGS. 18A and 18B.

As described above, in the fourth embodiment, the photographing lens optical system, the distance measuring optical system, and the light measuring optical system are separately disposed, respectively.

As shown in FIG. 18B, the photographing field of view, when the photographing lens 108 is located on the telescopic side with a certain distance, is set to 110T, whereas the photographing field of view, when the photographing lens 108 is located on the wide angle side with a certain distance, is set to 110W.

In the fourth embodiment, since the field of view of the finder is in agreement with the photographing field of view, the photographing fields of view 110T and 110W also correspond to the field of view of the finder.

In contrast, the photographing lens optical system is different from the distance measuring optical system in the fourth embodiment, the distance measuring field of view is unchanged at all times regardless of the focal length of the photographing lens 108 as shown in FIG. 18A.

In FIG. 18A, the field of view of an N-th point, which is located at approximately the center of the 13 divisional distance measuring points, is shown by 120T as an example.

Figure 19A:
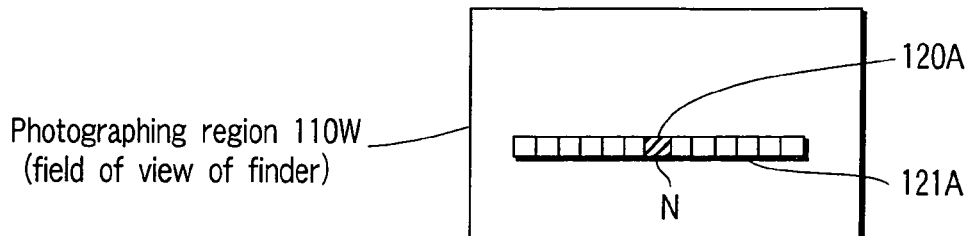
Figure 19B:
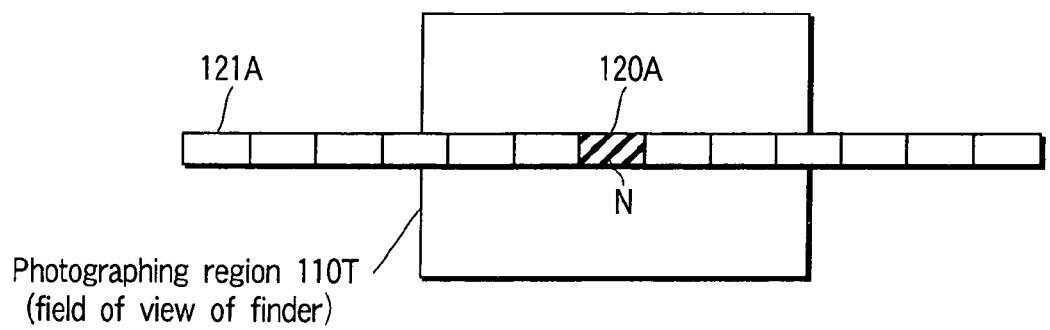

FIGS. 19A and 19B show the photographing fields of view (photographing pictures, photographing ranges, or pictures observed by a photographer through a finder) of the specific example of FIGS. 18A and 18B (in this embodiment, a finder field of view is associated with a photographing field of view);

FIGS. 19A and 19B show a field of view 120A (slanted portion) of each distance measuring point with respect to the photographing picture and a field of view 121A of the distance measuring sensors 103a and 103b when the focal length is located on the wide angle side (FIG. 19A) and when it is located on the telescopic side (FIG. 19B).

As can be seen from FIGS. 19A and 19B, the size of the field of view 121A of the distance measuring sensors and the size of the field of view 120A of the distance measuring point are different from the size of the photographing field of view (range) acting as a reference.

That is, the size of the field of view 121A of the distance measuring sensors and the size of the field of view 120A of the distance measuring point are apparently different from the size of the photographing field of view to the photographer who observes a subject through the finder having the field of view equal to the photographing field of view.

The following disadvantage arises when counterlight is detected by using, for example, the value of light measured at the distance measuring point N as measured light and comparing it with the values of light measured on an overall photographing picture (the outputs from the light measuring sensors 106a and 106b).

When, for example, the photographing lens 108 is located on the wide angle side, there is a possibility that the light of the subject is erroneously measured because the value of light measured on the main subject and the field of view 120A are excessively small with respect to the photographing picture and the light of only a portion of the subject is measured.

There is a possibility, for example, that the light of a shaded portion of a face is measured or light reflected from the eyeglasses of the subject, and the like is measured.

Further, when the photographing lens 108 is located on the telescopic side, there is a possibility that the light of the subject is erroneously measured by, for example, measuring the light of the background of the subject together with the light of the subject because the value of light measured on the subject and the field of view 120A are excessively large with respect to the photographing picture.

Figure 19C:
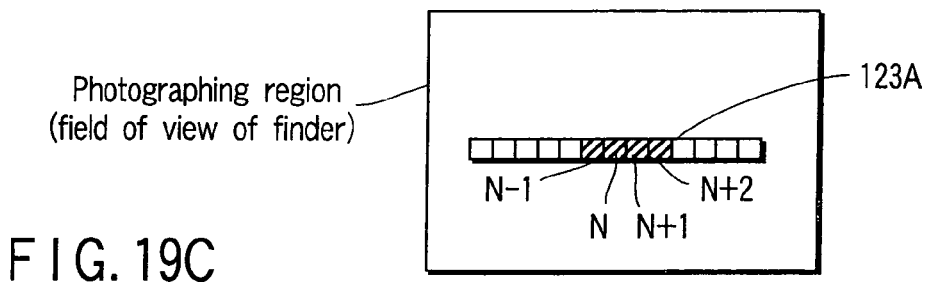
Figure 19D:
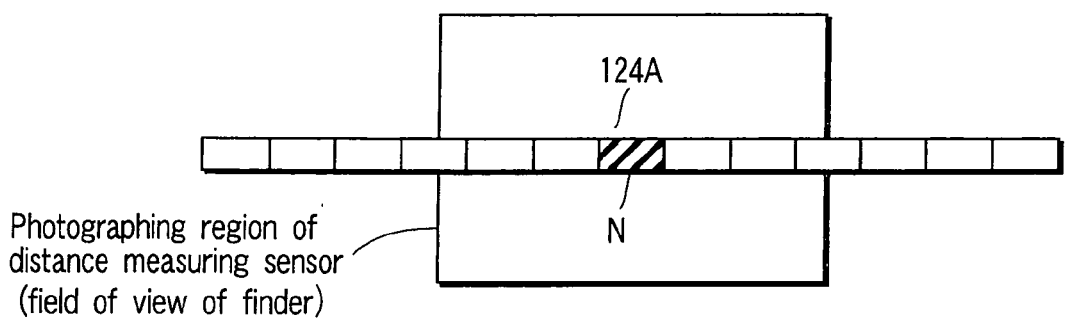

To cope with the above problems, the fourth embodiment is characterized in that a field of view, which is used to measure light using a distance measuring point in order to measure the luminance of the subject, is set to an approximately fixed size at all times with respect to the photographing field of view and the field of view of the finder by executing the processing shown in FIGS. 19C and 19D.

That is, when the photographing lens 108 is located on the wide angle side, the value, which is obtained by averaging the outputs from the distance measuring sensors at the distance measuring point N of FIG. 19C, the outputs from the distance measuring sensors at the distance measuring points N-1 and N+1 on both the sides of the point N, and further the outputs from the distance measuring sensors at a light measuring point N+2, is used as the light measured value of the main subject.

With this operation, a slanted portion 123A of FIG. 19C is used as the light measuring field of view of the main subject.

When the photographing lens 108 is located on the telescopic side, the value obtained by averaging the outputs from the distance measuring sensors at only the distance measuring point N is used as the light measured value of the main subject.

With this operation, a slanted portion 124A of FIG. 19D is used as the light measuring field of view of the main subject.

With this processing, a spot light measuring field of view, which is approximately as large as the photographing field of view, can be obtained to measure the light of the main subject on any of the wide angle side and the telescopic side.

Another example will be described in more detail with reference to FIGS. 20A and 20B.

That is, FIGS. 20A and 20B show a case in which a subject is located on the left side of a photographing picture and points on the left side are selected from the above 13 divisional distance measuring points.

When the photographing lens 108 is located on the wide angle side, a photographing field of view 130, the fields of view 131 and 132 of light measuring sensors, and the field of view 133 of distance measuring sensors are arranged in the relationship shown in FIG. 20A.

In this case, since the subject is located on the left side of the photographing picture, a point M is used as a distance measuring point.

In this case, since the photographing lens 108 is located on the wide angle side, points M−1, M, M+1, and M+2 are selected as the field of view for measuring the light of a main subject, and the average value of the outputs from the four points is used as the light measured value BVPS of a main subject.

Further, since the photographing lens 108 is located on the wide angle side in this case, the outputs from light measuring sensors 106a and 106b are averaged and a resultant average value is used as the light measured value BVAVG of an overall photographing picture.

Then, the light measured value BVPS of main subject is compared with the light measured value BVAVG of the overall photographing picture, and when the overall photographing picture is extremely brighter than the main subject, it is determined that the main subject is counterlight and an electronic flash is emitted in exposure.

In contrast, when the photographing lens 108 is located on the telescopic side, the photographing field of view 130, the fields of view 131 and 132 of the light measuring sensors, and the field of view 133 of the distance measuring sensors are arranged in the relationship shown in FIG. 20B.

Since the subject is located on the left side of the photographing picture also in this case, a point O is used as a distance measuring point.

Since the photographing lens 108 is located on the telescopic side, even when the main subject is located at approximately the same position as that of the case in which the photographing lens 108 is located on the wide angle side, a different point is selected as the distance measuring point.

For example, the distance measuring point on the telescopic side is O=5, while the distance measuring point on the wide angle side is M=3.

Since the photographing lens 108 is located on the telescopic side in this case, only the point O is selected as the light measuring field of view of the main subject, and the average value of the outputs from the one point is used as the light measured value BVPS of the main subject.

Further, since the photographing lens 108 is located on the telescopic side in this case, only the outputs from the light measuring sensor 106a is averaged and used as the light measured value BVAVG of the overall photographing picture.

Then, the light measured value BVPS of the main subject is compared with the light measured value BVAVG of the overall photographing picture, and when the overall photographing picture is extremely brighter than the main subject, it is determined that the main subject is counterlight, and the electronic flash is emitted in exposure.

Next, a specific sequence will be explained using a flowchart shown in FIG. 21 as to a case in which the above configuration is used in a zoom-lens camera whose focal length can be varied from 35 mm to 80 mm.

First, the photographer starts photographing by manipulating the switch input unit 113.

In step 101, the focal length, to which the photographing lens 108 is set at present, is detected by detecting a zoom position.

In step S102, the focal length detected in step S101 is stored as a parameter ZM.

In steps S103 and S104, distance measuring points near the main subject are selected from the 13 distance measuring points, and the distance of the main subject is calculated using the distance measuring sensors near the point of the main subject.

Since this is explained with reference to FIG. 15 to FIGS. 17A, 17B, and 17C in detail, the explanation thereof is omitted here.

In step S105, the distance measuring point of the main subject is stored as a parameter n. Since there are 13 distance measuring points, n is any of values 1 to 13.

In step S106, the luminance near the main subject is measured using the distance measuring sensors 103a and 103b near the main subject (this subroutine will be described later in detail).

In step S107, the spot luminance of the main subject obtained by measuring the light of the main subject is stored as a parameter BVSP.

Whether or not the focal length of the photographing lens 108 is located on the telescopic side beyond 50 mm is determined in step S108, and when the focal length is located on the telescopic side, the process goes to step S109, whereas when it is located on the wide angle side, the process goes to step S110.

In step S109, only the output from the light measuring sensor 106a described above is used as an average measured light value because the focal length of the photographing lens 108 is located on the telescopic side.

Then, the average luminance value of the overall photographing picture obtained from the output from the light measuring sensor 106a is stored as the parameter BVAVG.

In step S110, the average value of the output from the light measuring sensor 106a and the output from the light measuring sensor 106b is used as the average measured light value because the focal length of the photographing lens 108 is located on the wide angle side.

Then, the average luminance value of the overall photographing picture obtained from the outputs of the light measuring sensors 106a and 106b is stored as the parameter BVAVG.

In step S111, the photographing lens 108 is driven such that the subject distance obtained in step S104 is brought into focus.

In step S116, whether or not the photographing picture is dark and the electronic flash 116 must be emitted is determined from the average measured luminance of the overall photographing picture obtained in step S109 or S110.

Specifically, the parameter BVAVG is compared with a camera shake luminance value according to the focal length, and when the parameter BVAVG is smaller than the camera shake luminance value, the process goes to step S114, otherwise the process goes to step S112.

The camera shake luminance value is a value obtained by subtracting an ISO sensitivity value (SV value) from an EV value which is calculated from a stop value according to a set focal length and a camera shake limit shutter speed (1/focal length).

Whether or not the main subject is counterlight from the main subject luminance obtained in step S107 and the average measured luminance of the overall photographing picture obtained step S109 or S110 is determined in step S112.

Specifically, BVSP is subtracted from BVAVG, and when the difference of luminance is larger than one step, it is determined that the subject is counterlight, and the process goes to step S114. Otherwise, the process goes to step S113.

In step S113, the shutter 119 is controlled by a stop value according to the luminance value BVAVG, and the film 110 is exposed.

In step S114, the film 110 is exposed by controlling the shutter 119 by a shutter speed according to the luminance value BVAVG or by a shutter speed according to camera shake luminance. In addition to the above operation, the electronic flash 116 is emitted through the flash circuit 115 in order to properly expose the counterlight main subject or to properly improve the darkness of the overall photographing picture.

In step S115, the film 110 is wound up one frame because it has been exposed, thereby this sequence is finished.

FIG. 22 is a flowchart for explaining a subroutine of FIG. 21 for measuring the light of the main object in detail.

In steps S201 to S205, the parameters used to measure the light of the main subject are initialized.

In step S206, the output values from the distance measuring sensors 103a and 103b included in a distance measuring point n are subjected to A/D conversion by the A/D converter 104 and then averaged by the CPU 101, thereby the luminance value at the distance measuring point n is calculated and stored as a parameter BV (n).

In step S207, a parameter r is incremented by 1.

In step S208, it is determined by the parameter ZM whether or not the focal length is located on the telescopic side beyond 60 mm, and when the focal length is located on the telescopic side, the process goes to step S211, whereas when it is located on the wide angle side, the process goes to step S209.

In step S209, the output values from the distance measuring sensors 103a and 103b included at a distance measuring point n+1 are subjected to A/D conversion by the A/D converter 104 and then averaged by the CPU 101, thereby the luminance value at the distance measuring point n+1 is calculated and stored as a parameter BV (n+1).

In step S210, the parameter r is incremented by 1.

In step S211, whether or not the focal length is located on the telescopic side beyond 50 mm is determined by the parameter ZM, and when the focal length is located on the telescopic side, the process goes to step S214, whereas when it is located on the wide angle side, the process goes to step S212.

In step S212, the output values from the distance measuring sensors 103a and 103b included in a distance measuring point n−1 are subjected to A/D conversion by the A/D converter 104 and then averaged by the CPU 101, thereby the luminance value at the distance measuring point n−1 is calculated and stored as a parameter BV(n−1).

In step S213, the parameter r is incremented by 1.

In step S214, whether or not the focal length is located on the telescopic side beyond 40 mm is determined by the parameter ZM, and when the focal length is located on the telescopic side, the process goes to step S217, whereas when it is located on the wide angle side, the process goes to step S215.

In step S215, the output values from the distance measuring sensors 103a and 103b included in a distance measuring point n+2 are subjected to A/D conversion by the A/D converter 104 and then averaged by the CPU 101, thereby the luminance value at the distance measuring point n+2 is calculated and stored as a parameter BV(n+2).

In step S216, the parameter r is incremented by 1.

In step S217, BV(n), BV(n+1), BV(n+2), and BV(n−1) added by the CPU 101, and the resultant value is divided by r, thereby this routine is finished.

The value BV(n) is stored as the light measured value of the main subject in the range of the focal length from 60 mm to 80 mm by executing the above sequence.

Further, in the range of the focal length from 50 mm to 60 mm, the average value of the values BV(n) and BV(n−1) is stored as the light measured value of the main subject.

Further, in the range of the focal length from 40 mm to 50 mm, the values BV(n), BV(n−1), and BV(n+1) are stored as the light measured value of the main subject.

Further, in the range of the focal length from 35 mm to 40 mm, the values BV(n), BV(n−1), BV(n+1), and BV(n+2) are stored as the light measured value of the main subject.

FIGS. 23A and 23B show examples of displays in a finder to explain a finder display of the fourth embodiment.

That is, as shown in FIGS. 9A and 9B, a finer field of view 701T when the focal length of the photographing lens 108 is located on the telescopic side and a finder field of view 701W when it is located on the wide angle side are in agreement with the photographing field of views of the respective focal lengths.

Further, distance measuring fields of view 702T and 703T are caused to be in agreement with the fields of view of the respective distance measuring points of the distance measuring sensors 103a and 103b by the distance measuring optical system (using the finder field of view as a reference).

Further, finder displays 710 to 715 are display patterns used as indications when a distance and light are measured through the finder and superimposed on, for example, a finder surface.

Further, main subject light measuring areas 720 to 723 exemplify areas through which the light measured outputs of a single or a plurality of distance measuring points are selected according to the focal length in each of a telephoto mode and a wide angle mode and through which the spot measured light of the main subject is obtained.

As described above, in the camera of the fourth embodiment, the finder displays are arranged friendly to the photographer because the size of the finder displays can be caused to be in approximate agreement with the light measuring area of the main subject.

In the camera of the fourth embodiment, counterlight can be accurately detected because the outputs of light measured values near the multi distance measuring points are used to determine counterlight.

Further, in the camera of the fourth embodiment, the areas of the distance measuring sensors used to detect the light measured value of the main subject are changed according to the focal length.

With this configuration, since an area having approximately the same size on the finder can be used as the spot light measuring area of the main subject in the camera of the fourth embodiment, the photographer can easily find the area. Therefore, an error, which is caused when the light of a distant landscape other than the main subject or the light of only a part of the main subject is measured, is unlikely to arise.

Further, in the camera of the fourth embodiment, since the field of view of one distance measuring point is caused to be in approximate agreement with a spot light measuring field of view necessary in the telescope mode, a range excessively large as a spot is not detected even in the telescope mode.

Further, in the camera of the fourth embodiment, the area, in which the light of the main subject is measured, is caused to be in approximate agreement with the size of a distance measuring point displayed in the finder by changing the number of points used to measure the light of the main subject on both the wide angle side and the telescopic side. Accordingly, the photographer can easily manipulate the camera regardless of the focal length.

In the camera of the fourth embodiment, the distance measuring sensor is divided into the 13 blocks acting as the distance measuring points. However, the camera can be also applied to cases in which the outputs of the distance measuring sensor, which has blocks divided by various dividing methods, are used to measure the light of the main subject.

Further, the camera of the fourth embodiment uses the distance measuring sensor whose distance measuring points are disposed one-dimensionally. However, the camera can be also applied to a case in which the is outputs from a multi distance measuring sensor capable of measuring, for example, the distances of two-dimensional areas are used to measure the light of the main subject.

In this case, the average value of the outputs from sensors located at points adjacent to a distance measuring point above and below it can be used as the light measured value of the main subject.

While the fourth embodiment describes the camera using a silver film, the embodiment can be also applied to, for example, a digital camera having a photographing optical system and a distance measuring optical system different from those of the above camera.

In the camera of the fourth embodiment, the light measured value of the main subject is used to detect counterlight. However, the light measure value of the main subject may be used only when exposure is corrected from the light measured value of the main subject measured by the distance measuring sensors, the light measured values of the areas other than the main subject, the light measured value of the overall photographing picture, and the like using, for example, a similar configuration.

In the fourth embodiment, the light measured value of the main subject measured using a part of the distance measuring sensors and the average light measured value of the overall photographing picture measured using all the distance measuring sensors are used to determine exposure. However, the embodiment is not limited thereto, and the exposure may be determined using, for example, the light measured value of the main subject measured using a part of the distance measuring sensors and the light measured value of the overall photographing picture measured using all the distance measuring sensors.

Further, while the fourth embodiment shows an example of an automatic mode in which the camera automatically measures light and detects counterlight, the embodiment can be also applied to a configuration in which the distance measuring sensors are used to measure spot light and the like.

A spot light measuring region having approximately the same size can be obtained on the finder in both the telescope and wide angle modes by changing the number of the distance measuring sensors used to measure spot light according to the focal length also in this case.

As described above, according to the fourth embodiment of the present invention, there can be realized the camera that can cope with a photographing scene in which it is difficult to determine counterlight by the automatic exposure as well as can simply determine counterlight even when the photographing optical system has a different focal length.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
 a brightness and darkness distribution detecting unit which detects distribution of a bright portion and a dark portion in a photographing picture;
 a determining unit which determines a bright area and a dark area in the photographing picture by referring to brightness and darkness distribution detected by the brightness and darkness distribution detecting unit;
 a distances distribution detecting unit which detects distances distribution in the photographing picture and decides a focused position of a photographing lens in accordance with a detection result of the distances distribution detecting unit; and
 a controller which controls irradiation of flash light to emit a flash light when it is determined that both (1) the focused position decided by the distances distribution detecting unit corresponds to the dark area, and (2) a ratio of the bright portion to the dark portion is large from a detection result of the distribution of the bright portion and the dark portion.

2. A camera comprising:
 brightness and darkness distribution detecting means for detecting distribution of a bright portion and a dark portion in a photographing picture;
 means for determining a bright area and a dark area in the photographing picture by referring to brightness and darkness distribution detected by the brightness and darkness distribution detecting means;
 distances distribution detecting means for detecting distribution of distances in the photographing picture and deciding a focused position of a photographing lens in accordance with a detection result of the distances distribution detecting means; and
 control means for controlling irradiation of flash light to emit a flash light when it is determined that both (1) the focused position decided by the distances distribution detecting means corresponds to the dark area, and (2) a ratio of the bright portion to the dark portion is large from a detection result of the distribution of the bright portion and the dark portion.

3. A method of controlling exposure of a camera, comprising:
 detecting distribution of a bright portion and a dark portion in a photographing picture;
 determining a bright area and a dark area in the photographing picture by referring to the distribution of brightness and darkness;
 detecting distances distribution in the photographing picture and deciding a focused position of a photographing lens in accordance with a distances distribution detection result; and
 controlling irradiation of flash light to emit a flash light when it is determined that both (1) the decided focused position corresponds to the dark area, and (2) a ratio of the bright portion to the dark portion is large from a detection result of the distribution of the bright portion and the dark portion.

* * * * *